(12) United States Patent
Bahr et al.

(10) Patent No.: US 9,444,691 B2
(45) Date of Patent: Sep. 13, 2016

(54) METHOD AND DEVICES FOR RUNNING TECHNOLOGY SPECIFIC PUSH-BUTTON CONFIGURATION SESSIONS

(71) Applicant: SIEMENS AKTIENGESELLSCHAFT, München (DE)

(72) Inventors: Michael Bahr, Munich (DE); Rainer Falk, Poing (DE); Parag Mogre, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 154 days.

(21) Appl. No.: 14/394,054

(22) PCT Filed: Apr. 11, 2013

(86) PCT No.: PCT/EP2013/057603
§ 371 (c)(1),
(2) Date: Oct. 10, 2014

(87) PCT Pub. No.: WO2013/153165
PCT Pub. Date: Oct. 17, 2013

(65) Prior Publication Data
US 2015/0113138 A1  Apr. 23, 2015

(30) Foreign Application Priority Data
Apr. 11, 2012 (EP) .................... 12163681

(51) Int. Cl.
H04L 12/24 (2006.01)
H04W 74/00 (2009.01)
(Continued)

(52) U.S. Cl.
CPC .............. *H04L 41/28* (2013.01); *H04L 63/08* (2013.01); *H04L 63/107* (2013.01); *H04W 12/06* (2013.01); *H04W 74/002* (2013.01); *H04W 84/12* (2013.01)

(58) Field of Classification Search
CPC ..... H04L 41/28; H04L 63/08; H04L 63/107; H04W 74/002; H04W 84/12; H04W 12/06

USPC ........................................ 709/225
See application file for complete search history.

(56) References Cited

U.S. PATENT DOCUMENTS 6,934,752 B1 * 8/2005 Gubbi ................... H04L 69/324
370/392
8,897,169 B2 * 11/2014 Schrum, Jr. ............. H04L 45/02
370/248

(Continued)

FOREIGN PATENT DOCUMENTS

EP          12163681        4/2012

OTHER PUBLICATIONS

International Search Report for PCT/EP2013/057603 mailed Jul. 11, 2013.
(Continued)

*Primary Examiner* — Kostas Katsikis
(74) *Attorney, Agent, or Firm* — Slayden Grubert Beard PLLC

(57) ABSTRACT

Overlapping Push Button Configuration (PBC) sessions are prevented without any deadlocks of technology specific PBC methods by controlling the run of technology specific PBC sessions within a heterogeneous network of network node devices interconnected via at least one I interface and/or over multiple hops and authenticated for the network, by enabling a two-level PBC within the heterogeneous network based on a network node device of the network node devices being authenticated for the network as registrar, which is especially selectable or determined. Level-1 of the two-level PBC performed at the abstraction layer of the heterogeneous network accomplishes the detection of the wish for PBC, prevention of overlapping PBC sessions independent of underlying communication technology, coordination of technology-specific PBC runs, whereas in level-2 of the two-level PBC performed within a technology-specific communication technology a technology-specific PBC is used, which is triggered by the level-1.

21 Claims, 9 Drawing Sheets

(51) Int. Cl.
*H04L 29/06* (2006.01)
*H04W 12/06* (2009.01)
*H04W 84/12* (2009.01)

(56) References Cited

U.S. PATENT DOCUMENTS

| | | | | |
|---|---|---|---|---|
| 8,941,976 B1* | 1/2015 | Maroney | ................. | H04B 3/56 340/855.9 |
| 9,025,603 B2* | 5/2015 | Schrum, Jr. | ......... | H04L 12/5692 370/392 |
| 9,300,491 B2* | 3/2016 | Schrum | ................. | H04L 12/46 |
| 2007/0271398 A1* | 11/2007 | Manchester | ............. | H04B 3/54 709/249 |
| 2013/0067056 A1* | 3/2013 | Purkayastha | ..... | G06F 15/17306 709/223 |
| 2013/0121157 A1* | 5/2013 | Logvinov | ........... | H04L 41/0833 370/238 |
| 2013/0148642 A1* | 6/2013 | Abraham | ............. | H04W 8/005 370/338 |
| 2013/0148643 A1* | 6/2013 | Abraham | ............. | H04W 8/005 370/338 |
| 2013/0246783 A1* | 9/2013 | Ho | ....................... | H04L 9/0861 713/150 |
| 2014/0298427 A1* | 10/2014 | Bahr | ...................... | H04L 63/08 726/4 |
| 2014/0337952 A1* | 11/2014 | Bahr | .................. | H04L 41/0806 726/7 |
| 2015/0052357 A1* | 2/2015 | Bahr | ...................... | H04L 63/08 713/168 |
| 2015/0271021 A1* | 9/2015 | Logvinov | ........... | H04L 41/0833 370/238 |

OTHER PUBLICATIONS

Wi-Fi Protected Setup Specification, Version 1.0, Sep. 2006, pp. 1-109.

IEEE P1905.1TM/D02, Draft Standard for Convergent Digital Home Network for Heterogeneous Technologies, pp. 1-81, Dec. 2011, 84 pp. (including iv-vi, 7, vii-xii, 13-81).

P. Mogre et al., "Security Improvements for P1905.1", IEEE P1905. 1, Draft Standard for a Convergent Digital Home Network for Heterogeneous Technologies, Dec. 2011, pp. 1-10.

P. Mogre et al., "Push Button", IEEE P1905.1, Draft Standard for a Convergent Digital Home Network for Heterogeneous Technologies, Mar. 2012, 6 pp.

Wi-Fi Protected Setup Specification, Version 1.0h, Dec. 2006, pp. 1-110.

Nowak S. et al., "Towards a Convergent Digital Home Network Infrastructure", IEEE Transactions on Consumer Electronics, vol. 57; No. 4; Dec. 2011, pp. 1695-1703.

"Wi-Fi Protected Setup", printed from en.wikipedia.org/wiki/Wi-Fi_Protected_Setup, Nov. 2011, pp. 1-3.

* cited by examiner

METHOD AND DEVICES FOR RUNNING TECHNOLOGY SPECIFIC PUSH-BUTTON CONFIGURATION SESSIONS

CROSS REFERENCE TO RELATED APPLICATIONS

This application is the U.S. national stage of International Application No. PCT/EP2013/057603, filed Apr. 11, 2013 and claims the benefit thereof. The International application claims the benefits of European Application No. 12163681 filed on Apr. 12, 2012, both applications are incorporated by reference herein in their entirety.

BACKGROUND

Described below are a method for controlling the run of technology specific Push Button Configuration sessions within a heterogeneous network with multiple communication network technologies, a registrar network node device for controlling the run of technology specific Push Button Configuration sessions within a heterogeneous network with multiple communication network technologies, a computer readable storage media executable by a processor for controlling the run of technology specific Push Button Configuration sessions within a heterogeneous network with multiple communication network technologies and a heterogeneous network for controlling the run of technology specific Push Button Configuration sessions.

The current data-centric use of networks (Internet access, media streaming) is increasingly extended towards home control functionality (home automation for climate control, lighting, burglar alarm, home energy network). Such home networks use according to FIG. 1 for instance various communication network technologies like Ethernet (IEEE 802.3), WLAN/WiFi (IEEE 802.11), and Power Line Communication (PLC; IEEE 1901). For this reason they are heterogeneous. The standard IEEE P1905.1, which according to D02 Draft Standard for Convergent Digital Home Network (CDHN) for Heterogeneous Technologies from Dec. 14, 2011 (described in IEEE P1905.1/D02 Draft Standard for Convergent Digital Home Network for Heterogeneous Technologies, IEEE P1905.1 document 1905_1-11-0101-02) is currently under development, defines a home network standard supporting different network technologies by a specified "IEEE P1905.1"-Abstraction Layer.

FIG. 2 shows the design of the abstraction layer based on the ISO/OSI-Reference Model with a management and data plane. The abstraction layer is embedded in an IEEE P1905.1-Architecture above a Media Access Control (MAC)-layer and a Physical layer as part of a "Network Node Device" NND within the heterogeneous network. Thus, the network node device NND uses the cited technologies like Ethernet (IEEE 802.3), WLAN/WiFi (IEEE 802.11), and Power Line Communication (PLC; IEEE 1901) and additionally a technology according to the specification of the Multimedia over Coax Alliance (MoCA) via corresponding interfaces according to FIG. 2. It is not compulsory or mandatory for a typical network node device to support all cited communication technologies. It is possible that the network node device NND supports only one or two of the cited technologies or completely other network technologies. Thus the network node device NND supports at least one network technology.

At least one goal of the IEEE P1905.1 standardization activities is the security mechanism during a setup or registration of a new device, called an "enrollee", which wants to join the heterogeneous network. The security mechanism is needed to protect the home network from external attacks. Such security mechanisms have to be configured with a security credential (password, passphrase, cryptographic key) that is burdensome to set-up manually.

The specific problem of using a Push-Button Configuration (PBC) in an "IEEE P1905.1"-network comes from the fact that multiple devices (belonging even to different technologies) are activated to accept a new device. So in the current version of the standard, more than one device could register with the "IEEE P1905.1"-network after a single button press. An attacker node may therefore register undetected when an authorized registration of a new device takes place. Further, even in a scenario where there is no attacker node, if multiple existing nodes of the home network (for e.g. access points) activate their technology specific PBC mode simultaneously it may lead to failure of the new node's attempts to join the network. This is specifically the case when the access points (or the nodes involved in registering the new node in the network via the technology specific Push Button Configuration) are IEEE 802.11 (WLAN) access points supporting as a Push-Button Configuration in the WLAN environment a Wi-Fi Protected Setup (WPS). Taking this into account a technology specific Push Button Configuration is a Push Button Configuration, which is used specifically for each of the communication network technologies within the heterogeneous network.

Currently a push button method is provided in heterogeneous convergent digital home networks in order to allow the end-user to easily setup the security credentials and permit new network devices to join the convergent digital home network. An example for this is the mechanism provided in the IEEE P1905.1 draft standard under development. Here using the P1905.1 push button mechanism, technology specific Push Button Configurations (PBC) are activated on authenticated devices in the home network. This enables the new joining device to carry out a technology specific Push Button Configuration itself with a suitable device (based on range, connectivity, and media type) to get security credentials to join the home network.

One of the basic problems with this is, that multiple technology specific Push Button Configurations (PBC) triggered by the same push button event may actually fail because they recognize each other as a conflicting PBC run. This is especially the case in Wi-Fi Protected Setup (WPS) with "Wi-Fi"-devices.

The mechanisms provided however are limited, for example, they do not work for the case of home networks where multiple registrars are present [multiple registrars are possible, see page 11 of the "Wi-Fi Protected Setup (WPS)" Specification defined by the Wi-Fi Alliance Version 1.0, September 2006, which is the de-facto standard for WLAN security setup (see en.wikipedia.org/wiki/Wi-Fi_Protected_Setup and www.wi-fi.org/wifi-protected-setup).

Furthermore in the IEEE P1905.1 solution the technology specific Push-Button Configuration is started only by the registrar, which implies that for the case where the new device is not within range of the registrar, but within the range of another "Wi-Fi"-access point the Push-Button Configuration attempt fails.

Additionally, the registrar is a logical entity and can be separated from the access points. In this case the registrar itself might not have the capability to start a "Wi-Fi" specific Push Button Configuration at all. This will prevent any nodes from joining the network using the "Wi-Fi" technology specific PBC.

Convergent Digital Home Networks (CDHNs) are home networks where different heterogeneous communication technologies are converged in a single home network. This is done by introducing an abstraction layer above the different communication technologies. The goal is a common user view and user experience independent of the underlying communication technology.

Such a Convergent Digital Home Network is being defined, for instance, in the IEEE P1905.1 working group. The IEEE P1905.1 standard which is currently being defined specifies an abstraction layer, which converges IEEE 802.3, IEEE 802.11, IEEE 1901 (PLC), and Multimedia over Coax Alliance (MoCA®) and is extensible to other communication technologies.

Push Button Configuration is an accepted technique for user-friendly security setup in home networks. In a Convergent Digital Home Network, the push button configuration has to be agnostic to the underlying communication technologies.

The idea is that the user presses a push button on any of the network devices (the network Push Button Event (NW-PBE)) and on the new device, the enrollee (the enrollee Push Button Event (E-PBE)). This will start the push button configuration, even in the case where the network node with the NW-PBE and the enrollee have no communication technology in common, that is, they communicate through intermediate network nodes of the Convergent Digital Home Network. Changes to the technology-specific PBC method are considered to be too expensive and are not backward compatible.

Several communication technologies provide a technology-specific Push Button Configuration method (ts-PBC method). Such a method can be triggered by the abstraction layer of the Convergent Digital Home Network, but the ts-PBC is solely controlled by the rules of the specific communication technology. That is, the Convergent Digital Home Network can not influence the ts-PBC run except for starting it.

The problem of "overlapping PBC sessions" is, that more than one device (enrollee) wants to join the network for a single push button event. It can be assumed that one of the devices is an attacker. The problem of overlapping PBC sessions is according to FIG. 3 more severe in Convergent Digital Home Networks due to the potential multi-hop nature and the different communication technologies:

The overlapping PBC sessions might happen with different technologies, so that technology-specific mechanisms for the detection of overlapping PBC sessions will not work.

The geographic distance between the overlapping PBC sessions can be larger compared to ts-PBC sessions due to the multi-hop capability of the Convergent Digital Home Network. In a specific technology, the Push Button Configuration is usually focused on a single network device such as a Wi-Fi Access Point. In a Convergent Digital Home Network, the Push Button Configuration can happen at any network node with a ts-PBC method.

The "deadlock of technology specific PBC sessions" is a new problem that occurs in Convergent Digital Home Networks. If the Convergent Digital Home Network starts multiple ts-PBC sessions of the same communication technology due to the propagation of the NW-PBE to all Convergent Digital Home Network nodes, each ts-PBC session will detect each other as an overlapping session and will cancel the Push Button Configuration runs, so that no Push Button Configuration will happen for this communication technology at all.

Particularly, this is a problem of Wi-Fi Protected Setup, the PBC method for IEEE 802.11/Wi-Fi (cf. FIG. 3).

The current version of the draft IEEE P1905.1 specification does not define a mechanism for preventing or detecting overlapping sessions in the increased scope of this problem in Convergent Digital Home Networks.

IEEE P1905.1 submission 11/0087r1 (see [Parag Mogre, Michael Bahr: Security Improvements for P1905.1, IEEE P1905.1 document 1905_1-11-0087-01) defines a similar method that detects and prevents overlapping sessions in a Convergent Digital Home Network, but it requires some interaction with the technology-specific PBC method. The CDHN node detects an enrollee solely based on the received technology-specific PBC messages sent by the enrollee; and in case of overlapping PBC sessions a PBC Abort message stops ongoing ts-PBC runs.

Furthermore, such a functionality as a CDHN registrar is not known and some parts of the description are rather high level.

IEEE P1905.1 submission 12/007r1 (see Parag Mogre, Michael Bahr: Push Button, IEEE P1905.1 document 1905_1-12-0007-01) describes a scheme rudimentarily that at least detects overlapping PBC sessions, but cannot prevent them. The CDHN nodes are informed about successful Push Button Configurations.

The current version of the draft IEEE P1905.1 specification does define a method targeted at the problem of deadlock of ts-PBC sessions for the case of Wi-Fi Protected Setup. Only the Access Point (AP) where the NW-PBE occurred (push button pressed) or the Wi-Fi registrar can start the WPS push button method. The short-coming of this method is that an enrollee will never be able to connect to the network if it is only in range of an access point that will not be allowed to enable the WPS Push Button Configuration.

IEEE P1905.1 submission 12/007r1 describes an alternative scheme for the problem of deadlock of Wi-Fi Protected Setup PBC sessions. Here, only the AP where the NW-PBE occurred (push button pressed) is activated or all access points are activated with a random delay. This means, that all access points start their WPS PBC at different times thereby reducing the chance of deadlock due to technology-specific overlapping PBC sessions while connecting the enrollee at any access point of the Convergent Digital Home Network.

The most well-know technology-specific Push Button Configuration method is as indicated above the Wi-Fi Protected Setup (WPS) described in Wi-Fi Protected Setup Specification, Version 1.0, September 2006.

The method and network node device described below for controlling the run of technology specific Push Button Configuration sessions within a heterogeneous network with multiple communication network technologies as well as a heterogeneous network with multiple communication network technologies, is capable of achieving a reliable prevention of overlapping PBC sessions without any deadlocks of technology specific PBC methods.

SUMMARY

The enhanced mechanism described below controls the run of technology specific Push Button Configuration sessions within a heterogeneous network with multiple communication network technologies and a plurality of network node devices interconnected to each other via at least one interface and/or over multiple hops and authenticated or unauthenticated for the network, by enabling a two-level Push Button Configuration within the heterogeneous network, especially within a Convergent Digital Home Network (CDHN) according to the IEEE P1905.1 standard specific, based on a network node device of the network node devices being authenticated for the network as registrar, which is especially selectable or determined.

The level-1 of the two-level Push Button Configuration performed at the abstraction layer (cf. FIG. 2) of the heterogeneous network respectively the Convergent Digital Home Network (CDHN) accomplishes the detection of the wish for Push Button Configuration, prevention of overlapping PBC sessions independent of underlying communication technologies, coordination of technology-specific PBC runs, especially the selection of a network node for the technology specific Push Button Configuration (ts-PBC) and the triggering of the technology specific Push Button Configuration, whereas in the level-2 of the two-level Push Button Configuration performed within a technology-specific communication technology a technology-specific Push Button Configuration is used, which is triggered by the level-1 of the two-level Push Button Configuration.

Thereby especially the registrar network node device, called as CDHN registrar, should not be confused with a registrar of a technology-specific PBC method such as a WPS registrar (Wi-Fi Protected Setup). The method assumes a clear distinction between the functionality of the CDHN registrar and the functionality of a registrar for a technology specific Push Button Configuration method. However, real implementations may combine both functionalities.

It is advantageous to provide a method for reusing push button configuration methods specific to a communication technology in a convergent digital home network, such as for example IEEE 1905.1 networks.

It is advantageous to provide ease of use to the user of the home network and the same level of user experience of user convenience as well-known technology-specific push button configuration protocols such as the Wi-Fi Protected Setup.

The user can press the push buttons in any order, and the push button of any device already part of the network, independent of the available communication technologies at this device, will allow the new device to be authenticated for communication in the Convergent Digital Home Network with the corresponding PBC method.

It is advantageous to detect and prevent overlapping PBC sessions. At the CDHN level, this is the push button configuration of more than one enrollee for one push button event. On the other hand, the method allows having multiple PBC runs for multiple interface of the very same enrollee for a single PBE.

It is advantageous to avoid deadlock of technology-specific PBC runs. At the CDHN level, the CDHN registrar will collect and analyze candidate CDHN nodes for ts-PBC runs and does an election of the CDHN nodes that will start their ts-PBC method. This avoids deadlock of ts-PBC runs. Alternative selection criteria allow different degrees of granularity and smartness for the election of CDHN nodes.

It is advantageous that there is a single CDHN registrar, which coordinates the prevention of overlapping PBC sessions and potential deadlocks of ts-PBC runs. Simple methods for assigning the CDHN registrar functionality to a node of the Convergent Digital Home Network are provided.

It is advantageous to describe messages and the flow of these messages for exchanging information related to the Convergent Digital Home Network's Push Button Configuration (CDHN PBC) on the level-1 of the two-level Push Button Configuration.

The CDHN PBC is divided in two levels. The level-1 is located at the CDHN layer and controls the PBC functionality with respect to the Convergent Digital Home Network providing most of the positive CDHN user experience with respect to Push Button Configuration. The actual Push Button Configuration for a communication technology is performed with unchanged existing PBC methods of the communication technologies.

No changes to the ts-PBC methods are required. This avoids high costs for changes and ensures backward compatibility of home network devices.

BRIEF DESCRIPTION OF THE DRAWINGS

These and other aspects and advantages will become more apparent and more readily appreciated from the following description of the exemplary embodiments, taken in conjunction with Tables 1 to 4 and the accompanying drawings of which.

DETAILED DESCRIPTION OF THE PREFERRED EMBODIMENT

Figure 1:
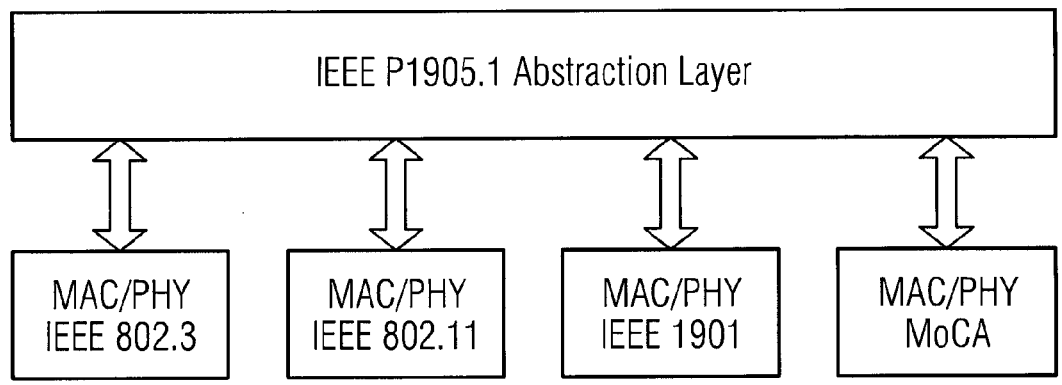
FIG. 1 is a block diagram of various communication network technologies.

Reference will now be made in detail to the preferred embodiments, examples of which are illustrated in the accompanying drawings, wherein like reference numerals refer to like elements throughout.

Figure 2:
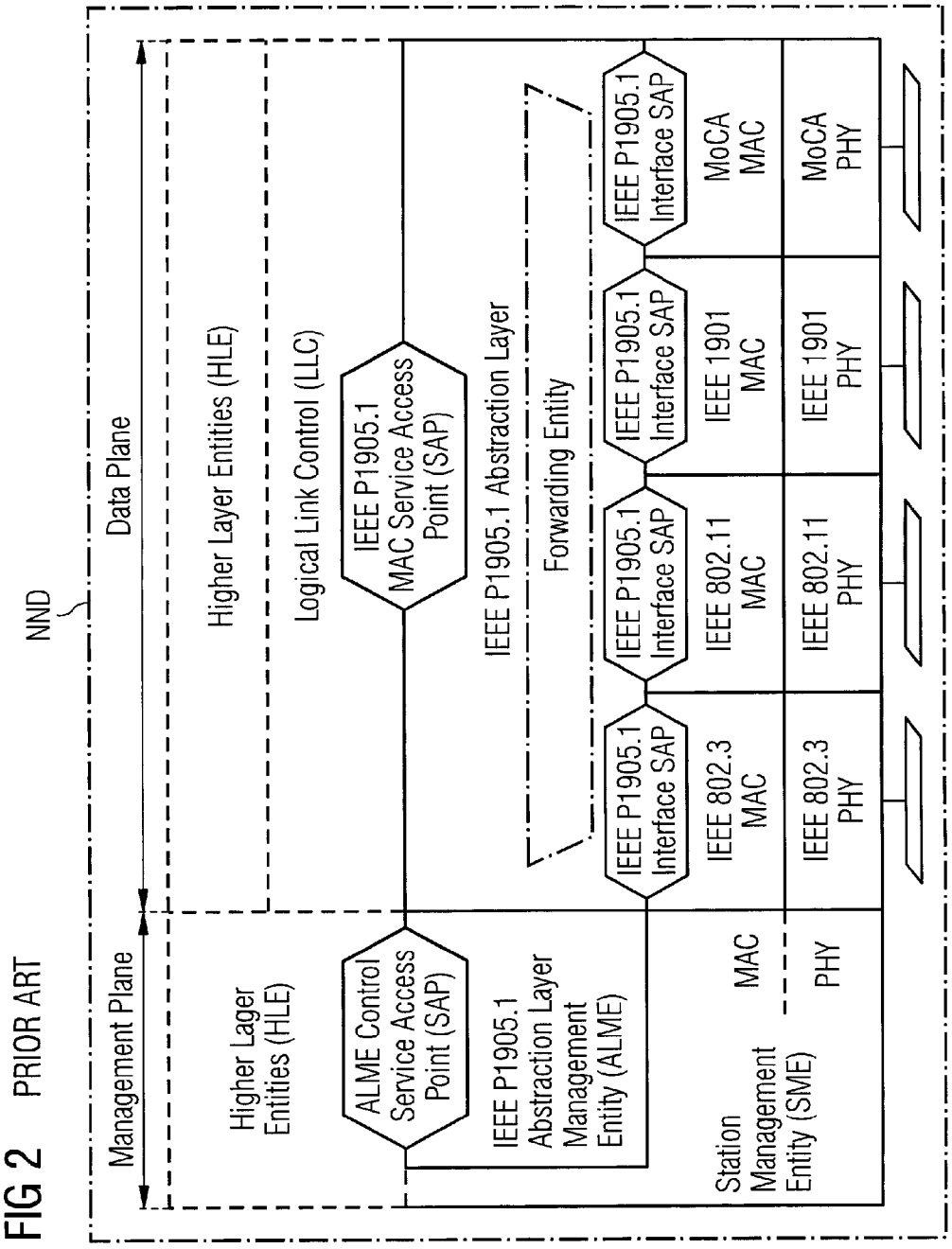
FIG. 2 is a block diagram of the design of the abstraction layer based on the ISO/OSI-Reference Model with a management and data plane.
Figure 3:
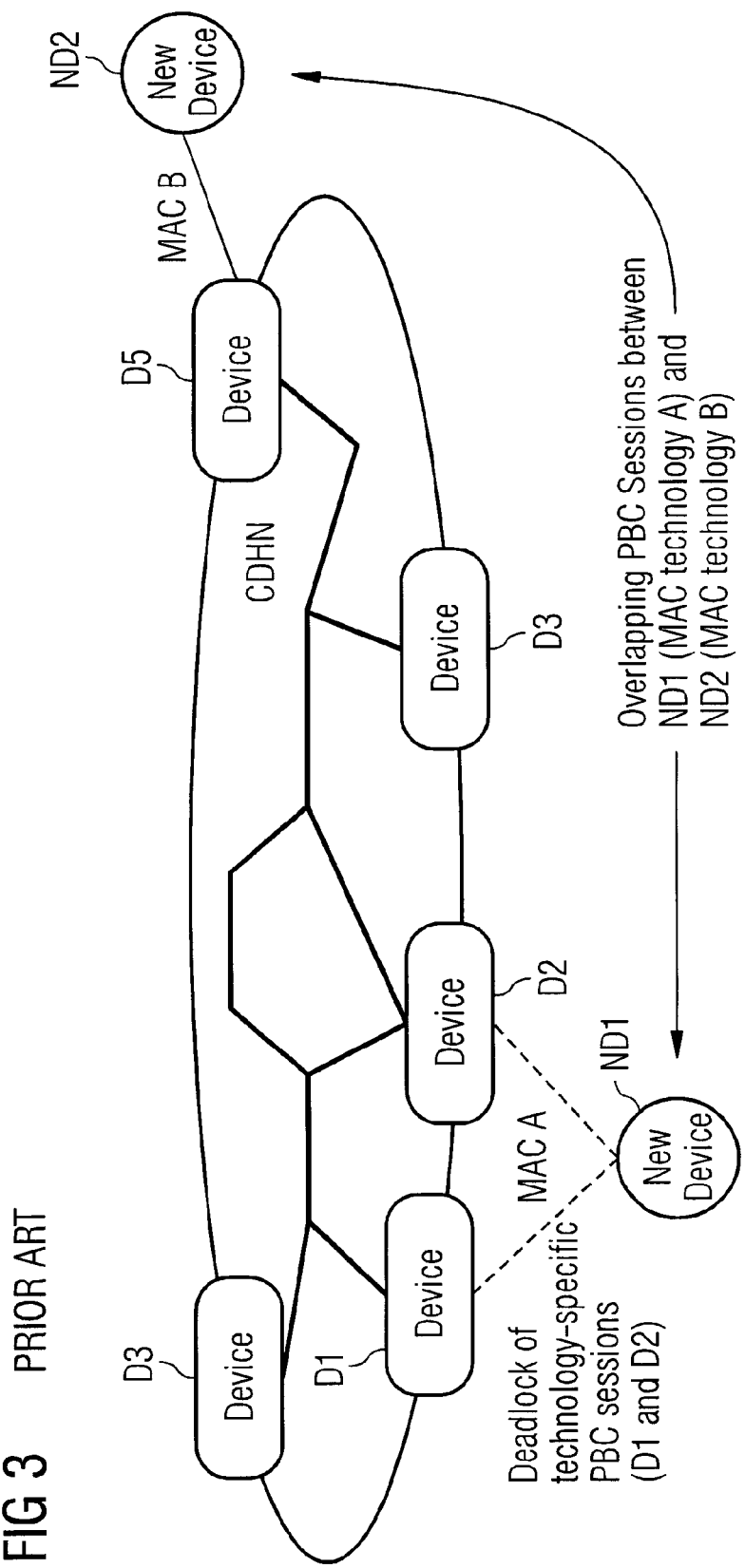
FIG. 3 is a block diagram illustrating overlapping PBC sessions.
Figure 4:
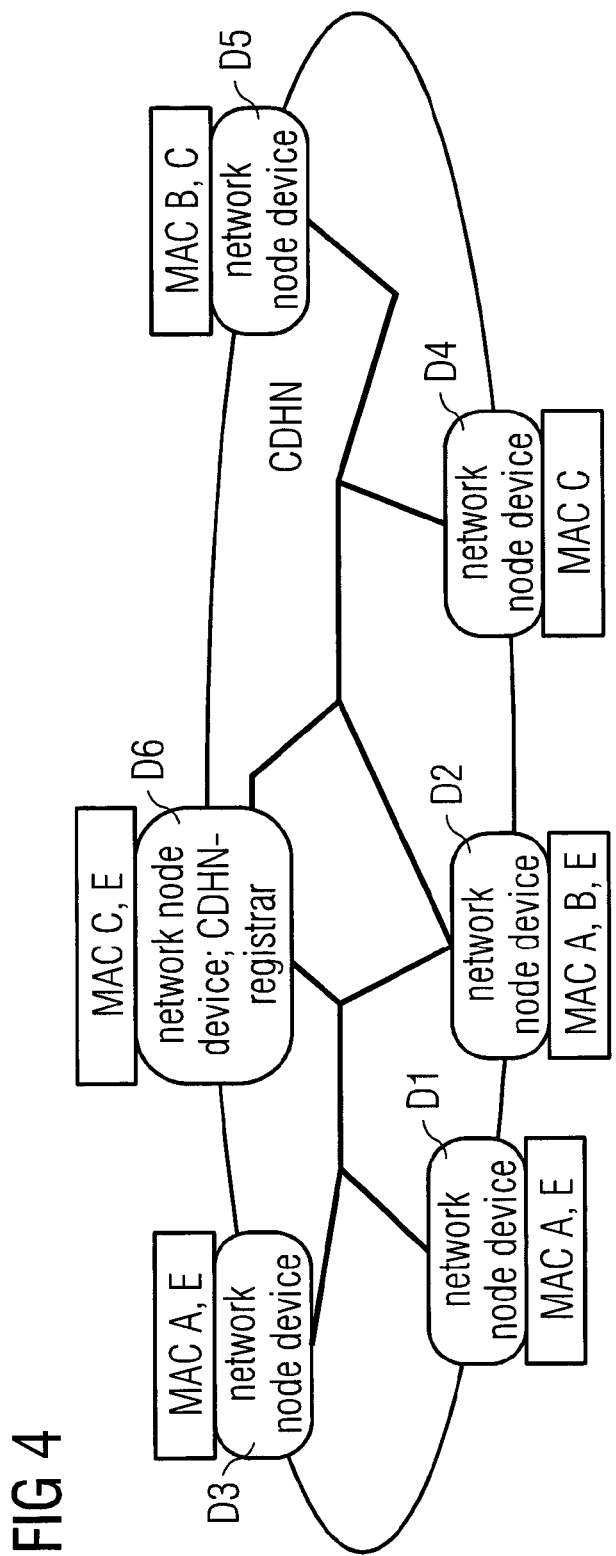
FIG. 4 is a block diagram of a Convergent Digital Home Network (CDHN) with different underlying communication technologies, FIG. 5 a sequence diagram with the message flow for a two-level Convergent Digital Home Network (CDHN) Push Button Configuration method.

FIG. 4 shows an example network topology of a heterogeneous network such as a Convergent Digital Home Network (CDHN). The network node devices D1 . . . D6 of the Convergent Digital Home Network are connected with each other through possibly heterogeneous communication technologies. The network node devices of the Convergent Digital Home Network are also called CDHN nodes. Communication between devices of the network can be over multiple hops. The Convergent Digital Home Network of FIG. 4 contains besides the network node devices respectively CDHN nodes D1 . . . D6 more network node devices than the cited ones and those devices are intermediate nodes on the communication between CDHN nodes D1 . . . D6. With respect to FIG. 2 the devices have different underlying communication technologies MAC "A", MAC "B", MAC "C", and MAC "E". The MAC "A" might be WLAN/WiFi (IEEE 802.11), the MAC "C" might be the Power Line Communication (PLC; IEEE 1901), the MAC "E" might be Ethernet (IEEE 802.3), and the MAC "B" might be some other communication technology, e.g. Multimedia over Coax Alliance (MoCA).

The IEEE 1905.1 specification is an example for a Convergent Digital Home Network (CDHN). An embodiment is described below with general CDHN terminology. A similar embodiment is also applicable for IEEE 1905.1 networks and similar networks.

According to the embodiment described below, the Convergent Digital Home Network contains a network node device, namely the registrar network node device or CDHN registrar. The CDHN registrar is a logical component with a special functionality that can be located at any network node device of the Convergent Digital Home Network.

According to FIG. 4 the registrar functionality is assigned to the network node device D6. The assignment to a network node device can be done by selection/determination of a single CDHN registrar based on different methods, amongst them are:

M1: Manual configuration (mechanical configuration through e.g. switches, by software e.g. a network management tool)

M2: The first node of the Convergent Digital Home Network becomes the CDHN registrar.

M3: The gateway of the home network is the CDHN registrar.

M4: The CDHN node in the network where the Push Button has been pressed [where network Push Button Event (NW-PBE) happened] becomes the CDHN registrar for this CDHN Push Button Configuration.

M5: Selection algorithm that leads to a choice of the CDHN registrar that is consistent between all nodes of the Convergent Digital Home Network.

The information which CDHN device is the CDHN registrar needs to be made available to all nodes in the Convergent Digital Home Network.

For methods M1, M2, and M3 for selecting a single CDHN registrar, this can be done for instance by announcing the CDHN Registrar with corresponding announcement messages in the Convergent Digital Home Network. These CDHN registrar announcement messages can be, for instance, broadcast to all nodes in the Convergent Digital Home Network by relayed multicast.

For method M4 for selecting a single CDHN registrar, this information corresponds to the originator of the PBE Notification message (described in the following) and can be taken from a notification message notifying about the Push Button Event, e.g. the network Push Button Event NW-PBE, the so-called PBENotification message.

For method M5 for selecting a single CDHN registrar, this information might be provided by the used selection algorithm or the CDHN registrar is announced as for methods M1, M2, and M3.

Once again the CDHN registrar should not be confused with a registrar of a technology-specific Push Button Configuration method such as a WPS registrar. The method assumes a clear distinction between the functionality of the CDHN registrar and the functionality of a registrar for a technology-specific Push Button Configuration method. However, real implementations may combine both functionalities.

The level-1 of the two-level Push Button Configuration performed at the abstraction layer (cf. FIG. 2) of the heterogeneous network respectively the Convergent Digital Home Network (CDHN) accomplishes the detection of the wish for Push Button Configuration, prevention of overlapping PBC sessions independent of underlying communication technology, coordination of technology-specific PBC runs, especially the selection of a network node for the technology specific Push Button Configuration (ts-PBC) and the triggering of the technology specific Push Button Configuration, whereas in the level-2 of the two-level Push Button Configuration performed within a technology-specific communication technology a technology-specific Push Button Configuration is used, which is triggered by the level-1 of the two-level Push Button Configuration.

Different actions are performed on the enrollee and the network nodes for the level-2 of the Convergent Digital Home Network Push Button Configuration method. Enrollee and CDHN nodes can be distinguished, for instance, based on their authentication and association state. Some examples are shown in Table 1.

TABLE 1

Examples for distinction between enrollee and CDHN node

| Enrollee | CDHN node |
|---|---|
| no valid network ID | valid network ID |
| not associated to CDHN | associated to CDHN |
| unauthenticated network interfaces (no authenticated network interface) | has authenticated network interfaces |
| no successful push button configuration done | successful push button configuration done |

In order to authenticate a new CDHN node, the enrollee, with another CDHN node that is already part of a Convergent Digital Home Network, a push button has to be pressed at the enrollee and at any CDHN node of the network. The push button can be a real button, a software button, or a virtual button (by, e.g., a software instruction triggering a Push Button Event). The order for pressing the push buttons is arbitrary (enrollee first or enrollee second).

Pressing the push button at the enrollee creates a Push Button Event (PBE), it is called the enrollee Push Button Event (E-PBE). Pressing the push button at the network node device creates a Push Button Event (PBE), it is called the network Push Button Event (NW-PBE).

Figure 5:
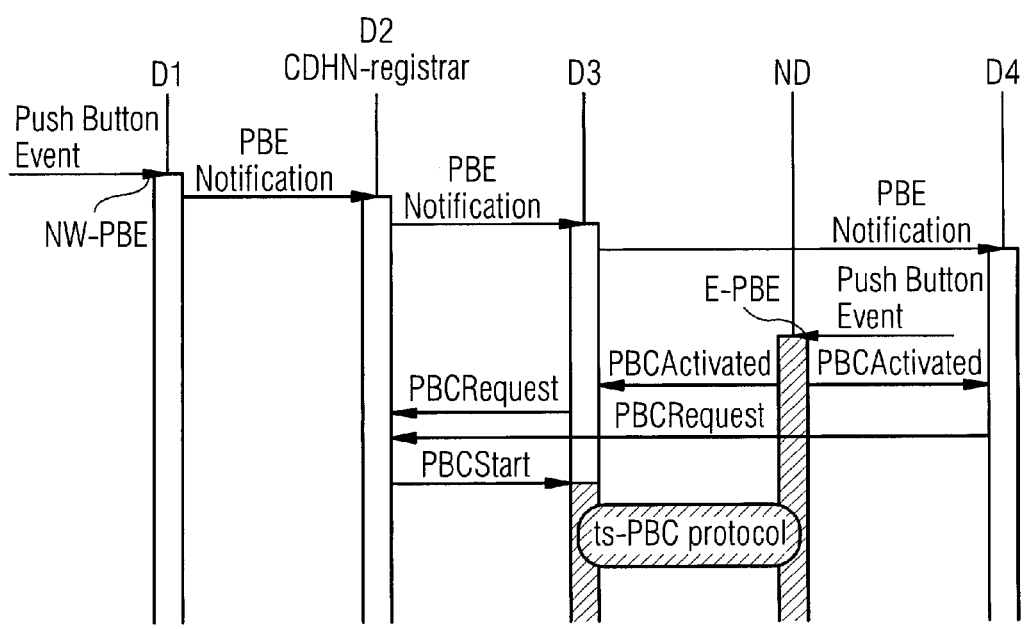

FIG. 5 shows the flow of messages in a CDHN network according to an embodiment in a sequence diagram. The messages are explained further on in the text, including when to generate the messages and what to do upon the receipt of a message.

Upon pressing a push button on a new device ND as enrollee being unauthenticated for the heterogeneous network an enrollee Push Button Event E-PBE is released for what reason the enrollee start its technology-specific Push Button Configuration (ts-PBC) and announce its wish to perform a PBC run at the CDHN layer (level-1 of the two-level Push Button Configuration) by sending, especially periodically, PBCActivated messages.

Upon pressing a push button on one network node device of the network node devices D1 . . . D4 being authenticated for the network, which is e.g. according to FIG. 5 the first network node device D1, a network Push Button Event NW-PBE is released for what reason the first network node device D1 distributes the Push Button Event NW-PBE to all other authenticated CDHN nodes D2, D3, D4 of the network node devices D1 . . . D4 in the network—of which according to FIG. 5 the network node device D2 is the CDHN registrar and the network node devices D3, D4 are adjacent to the enrollee—the new network node device ND—by sending and relaying a PBENotification message.

The network node devices D1 . . . D4 are listening for PBCActivated messages during a CDHN Walk Time. The information of the PBCActivated message and additional information is forwarded to the CDHN registrar D2 in PBCRequest messages. The CDHN registrar D2 selects the CDHN node D3 and the corresponding interfaces that are allowed to perform a technology-specific Push Button Configuration run based on the information of the collected PBCRequest messages.

If the CDHN registrar detects overlapping Push Button Configuration sessions, no CDHN node is selected. If the CDHN registrar detects a possible deadlock of technology-specific Push Button Configurations, only one candidate CDHN node or interface is selected.

A PBCStart message is sent to the selected CDHN node D3 by the CDHN registrar D2. On receipt of a PBCStart message, the CDHN node D3 starts its technology-specific Push Button Configuration on the specified interface.

Level-1 Actions of the Two-level Push Button Configuration on an Enrollee Push Button Event E-PBE at the Third Network Node Device Respectively the Enrollee ND (Level-1 Actions on E-PBE):

On an enrollee Push Button Event E-PBE, the enrollee ND takes the following actions at the CDHN layer (level-1 of the two-level Push Button Configuration):

The enrollee goes into a state "CDHN_PBC_enabled", where level-1 actions of the CDHN Push Button Configuration method are allowed. This state has a maximum duration of a CDHN walk time, for instance, 120 seconds.

Note: The state CDHN_PBC_enabled is a logical concept in this description and can be described and implemented in many different ways, for example, as state variable, as Boolean variable, as timer, as active timer, as "during CDHN walk time", etc.

The enrollee starts the technology-specific Push Button Configuration methods (ts-PBC methods), if available, on each of its unauthenticated (CDHN) interfaces.

If the enrollee is in state CDHN_PBC_enabled, it sends messages "PBCActivated" to all its unauthenticated (CDHN) interfaces especially periodically. The periodicity has to be chosen in such a way that fast discovery of the enrollee within the CDHN walk time is ensured. The interval for PBCActivated messages may be, for instance, 1 second. The periodicity might be different at the different interfaces and might be determined by specific mechanisms of the underlying communication technology (e.g. beacon intervals).

The PBCActivated message can be realized in different ways, for example:

As a specific PBCActivated message.

As one or more additional data structures, so called Type Length Value (TLV) encodings, included in already existing message specifications, e.g. Neighbor Discovery messages.

The PBCActivated message or its representation includes the following parameters amongst other possible parameters:

Some ID or type value that indicates that it is a PBCActivated message or equivalent (Parameter A1).

The CDHN MAC Address of the enrollee. This is required to recognize duplicates of the PBCActivated message of the same enrollee (Parameter A2).

A Push Button Event ID (PBE ID). This is a parameter that helps to distinguish multiple push button events of the same enrollee (Parameter A3).

The MAC Address of the interface, through which the PBCActivated message has been sent. This is a parameter to distinguish multiple interfaces, especially of the same communication technology (Parameter A4).

Media information about the communication technology of the interface, through which the PBCActivated message has been sent. This is a parameter that can help the CDHN registrar to make a better selection of the CDHN node for the technology-specific PBC run. The media information is less useful for wired communication technologies than for wireless communication technologies. Moreover, the media information can be used to distinguish PBCActivated messages of the same enrollee that are sent over different communication technologies (Parameter A5).

Level-1 Actions of the Two-Level Push Button Configuration on a Network Push Button Event NW-PBE at the First Network Node Device Respectively the CDHN Node D1 (Level-1 Actions on NW-PBE):

On a network Push Button Event NW-PBE the CDHN node D1 takes the following actions at the CDHN layer (level-1 of the two-level Push Button Configuration):

The CDHN node goes into a state "CDHN_PBC_enabled", where level-1 actions of the CDHN Push Button Configuration method are allowed. This state has a maximum duration of CDHN walk time, for instance, 120 seconds.

Note: The state CDHN_PBC_enabled is a logical concept in this description and can be described and implemented in many different ways, for example, as state variable, as Boolean variable, as timer, as active timer, as "during CDHN walk time", etc.

The CDHN node sends a Push Button Event Notification message (PBE Notification message) to all other nodes of the CDHN. The PBENotification message may be sent by broadcast or relayed multicast.

The PBENotification message or its representation includes the following parameters:

Some ID or type value that indicates that it is a PBENotification message or equivalent.

The CDHN MAC Address of the originator of the PBENotification message, that is, the CDHN node with the NW-PBE. This is a parameter. can be used to recognize multiple NW-PBEs.

A Push Button Event ID (PBE ID). This is a parameter that helps to distinguish multiple push button events of the same CDHN node or within the CDHN.

Both, CDHN MAC Address and/or PBE ID can be used to detect duplicate PBENotification messages during the propagation within the Convergent Digital Home Network.

On receipt of a PBENotification message a CDHN node takes the following actions at the CDHN layer (level-1 of the two-level Push Button Configuration):

- The CDHN node may perform duplicate detection for the received PBENotification message and discards any duplicates of an already received PBENotification.
- The CDHN node goes into a state "CDHN_PBC_enabled", where level-1 actions of the CDHN Push Button Configuration method are allowed. This state has a maximum duration of CDHN walk time, for instance, 120 seconds.
  Note: The state CDHN_PBC_enabled is a logical concept in this description and can be described and implemented in many different ways, for example, as state variable, as Boolean variable, as timer, as active timer, as "during CDHN walk time", etc.
- The CDHN node propagates the PBENotification method according to the propagation rules (broadcast, relayed multicast, duplicate detection) to its neighbor CDHN nodes.

Now, all nodes of the Convergent Digital Home Network are in state CDHN_PBC_enabled and wait for the receipt of PBCActivated messages sent by the enrollee.

If a CDHN node is in state CDHN_PBC_enabled and receives a PBCActivated message it does the following:

- The CDHN node may perform duplicate detection for the received PBCActivated message and discards any duplicates of an already received PBCActivated message.
- The CDHN node sends the content of the PBCActivated message to the CDHN registrar, e.g., by (relayed) unicast. This can be realized in different ways:
  Forwarding the PBCActivated message to the CDHN registrar.
  As a specific message, for instance, a Push Button Configuration Request (PBCRequest) message.
  As one or more additional data structures, so called Type Length Value (TLV) encodings, included in already existing message specifications that are sent to the CDHN registrar.

The forwarded PBCActivated message, the PBCRequest message, or their representations may include the following additional parameters:

- Some ID or type value that indicates that it is a PBCRequest message or equivalent (Parameter A6).
- Media information about the communication technology of the interface through which the PBCActivated message has been received. This is a parameter that can help the CDHN registrar to make a better selection of the CDHN node for the technology-specific PBC run. The media information is less useful for wired communication technologies than for wireless communication technologies. However, the media information can be used to distinguish PBCActivated messages of the same enrollee that are sent over different communication technologies (Parameter A7).
- Some additional information about the link quality. This is a parameter with information especially useful for wireless interfaces. The CDHN registrar can base the election of the network node for the PBC run on the best link quality (Parameter A8).
- The CDHN MAC Address of the recipient of the PBCActivated message or the originator of the PBCRequest message. This is required in order to know the CDHN node that is a potential candidate for being selected for performing a technology-specific PBC run, i.e. being the recipient of a PBCStart message (Parameter A9).
- A Push Button Event ID (PBE ID). This is a parameter that helps to distinguish multiple push button events in the network. It also helps to link PBENotification messages and PBCActivated/PBCRequest messages to a specific push button event (Parameter A10).
- The MAC Address of the interface through which the PBCActivated message has been received. This is a parameter to distinguish multiple interfaces at the same CDHN node, especially of the same communication technology (Parameter A11).

In the following, the term PBCRequest message is used for the above described forwarded and extended PBCActivated message, the PBCRequest message containing the content of the received PBCActivated message, or the corresponding representation.

If a CDHN registrar is in state CDHN_PBC_enabled and receives a PBCRequest message it does the following:

- If it is the first PBCRequest message it receives during this CDHN walk time or period of state CDHN_PBC_enabled, it saves the received PBCRequest message and waits some time T_wait_PBCRequest in order to wait for possible further PBCRequest messages.
  T_wait_PBCRequest is smaller than CDHN walk time and may be, for example, 10, 12, or 20 seconds. T_wait_PBCRequest should cover a time period that allows all CDHN nodes to receive PBCActivated message from the enrollee (if there is a possible link between the enrollee and the CDHN node) plus the necessary time for the generation and the communication of the PBCRequest from the CDHN node to the CDHN registrar.
- After T_wait_PBCRequest is over, the CDHN registrar performs the methods for detecting and preventing overlapping PBC sessions and for electing the CDHN node(s) for running the ts-PBC.

Detection and Prevention of Overlapping PBC Sessions:

The CDHN registrar counts how many different enrollee CDHN MAC addresses are contained in all PBCRequest messages received during T_wait_PBCRequest.

If all received PBCRequest message contain the same Parameter A2, the enrollee CDHN MAC address, (count is 1), only a single enrollee wants to join the network and the registrar can proceed to the election of an (already authenticated) CDHN node for the ts-PBC run.

If there are different Parameter A2, the enrollee CDHN MAC address, in all received PBCRequest messages (count is greater than 1), there are multiple enrollees wanting to join the network. This constitutes overlapping PBC sessions in a Convergent Digital Home Network. The overlapping sessions are prevented by not election any CDHN node for the ts-PBC run, that is, the enrollees will not find a partner for their technology-specific Push Button Configuration. In case of overlapping PBC session, the CDHN may issue an error indication or starts any appropriate action for the case of overlapping PBC sessions.

However, it might happen due to unfortunate timing of the push button event at the second (overlapping) enrollee, that the PBCRequest messages triggered by the PBCActivated messages of this second (overlapping) enrollee arrive only after the CDHN registrar has already elected and informed a CDHN node for the ts-PBC run and while the CDHN walk time is still active, that is, the CDHN registrar is still in the state CDHN_PBC_enabled for the same NW-PBE. In this case no CDHN node is elected for this enrollee, that is, the second (overlapping) enrollee will not find a partner for its ts-PBC. Since it is not clear whether the first or the second enrollee is the one the user wishes to authenticate, the Convergent Digital Home Network may issue an error indication or starts any appropriate action for this case of overlapping PBC sessions.

In an extension, the chances for such a situation of overlapping PBC sessions (first enrollee already authenticated before second enrollee is detected) can be decreased by increasing the duration of T_wait_PBCRequest. Here, the CDHN registrar will listen longer for PBCRequest messages.

Election of CDHN Node(s) for Running the Technology-specific Push Button Configuration (Ts-PBC):

A CDHN node for running the ts-PBC is only selected if there is exactly one enrollee (CDHN device).

The CDHN registrar elects the CDHN node or nodes for running the technology-specific push button configuration based on the Parameter A4 and Parameter A11 that are contained in all PBCRequest messages received during T_wait_PBCRequest.

Each distinct Parameter A4, the MAC Address of the interface through which the PBCActivated messages have been sent by the enrollee, corresponds to an interface of the enrollee for which a ts-PBC has to be triggered at one of the CDHN nodes.

The CDHN registrar determines how many different Parameter A11, the MAC Address of the interface through which the PBCActivated message has been received at the originator of the PBCRequest message, are reported for each distinct Parameter A4 in the received PBCRequest messages. In other words, the tuples <Parameter A4, Parameter A11> are analyzed or, with other words, all potential links between the enrollee and a CDHN node of the network are counted and analyzed.

If there is only one distinct Parameter A11 for a specific Parameter A4, then only one CDHN node is a potential PBC partner. The originator of the corresponding PBCRequest (Parameter A9) will be elected as CDHN node for the ts-PBC for this communication technology defined by the interface (Parameter A11).

If there is more than one distinct Parameter A11 for a specific Parameter A4, then more than one communication technology interfaces are potential PBC partners for the very same interface of the enrollee. The different communication technology interfaces might be located at the same CDHN node or at more than one CDHN nodes. It is very likely, that a deadlock of the ts-PBC will happen if all originators of the corresponding PBC Requests (Parameter A9) will be elected as CDHN node for the ts-PBC for the communication technology defined by the interfaces (Parameter A11). The CDHN registrar elects one CDHN node and one of its reported interfaces of the possible CDHN nodes and interfaces as CDHN node for the ts-PBC for this communication technology defined by the interface (Parameter A11). The possible CDHN nodes and interfaces are reported in the received PBCRequest messages and determined in the analysis of the tuples <Parameter A4, Parameter A11.

Alternative parameter choices for detecting multiple candidate CDHN nodes for a specific interface of the enrollee are amongst others:
  CDHN MAC Address of the recipient of the PBCActivated message (tuples <Parameter A4, Parameter A9>):
    The CDHN MAC Address provides the capability to detect multiple candidate CDHN nodes independent of their communication technologies that could connect to the enrollee.
  Media Information (tuples <Parameter A4, Parameter A5> or <Parameter A4, Parameter A7>): The media information provides the capability to detect multiple candidate CDHN nodes for the same technology. Only one candidate CDHN node for a communication technology is selected. Based on pre-knowledge which communication technology will cause deadlock for ts-PBC runs, only for those the selection of CDHN nodes has to be restricted to a single elected CDHN node in an extension.
  Any combination of Parameter A11, Parameter A9, Parameter A4, or Parameter A5. The more information is available the more fine-grained and smarter the election of CDHN nodes can be performed.

The CDHN registrar sends a PBCStart message to all elected CDHN nodes. The PBCStart messages may be sent by (relayed) unicast.

The PBCStart message can be realized in different ways:
  As a specific PBCStart message.
  As one or more additional data structures, so called Type Length Value (TLV) encodings, included in already existing message specifications.

The PBCStart message or its representation includes the following parameters among others:
  Some ID or type value that indicates that it is a PBCStart message or equivalent.
  The CDHN MAC Address of the elected CDHN node. This CDHN node has been an originator of a PBCRequest message. The value for this parameter can be taken from Parameter A9 of the corresponding PBCRequest message (CDHN MAC Address of the recipient of the PBCActivated message or the originator of the PBCRequest message). This is required as the destination of the PBCStart message (Parameter A12).
  The MAC Address of the interface at which the technology-specific PBC run has to be started. This is a parameter with a value that can be taken from Parameter A11 of the corresponding PBCRequest message (MAC Address of the interface through which the PBCActivated message has been received). This parameter is necessary if the ts-PBC run has to be started not at all interfaces but only at a specific interface (Parameter A13).
  A Push Button Event ID (PBE ID). This is a parameter that helps to distinguish multiple push button events in the network. It also helps to link PBENotification messages, PBCActivated/PBCRequest messages, and PBCStart messages to a specific push button event. The value of this parameter can be taken, for instance, from Parameter A10 of the PBCRequest message (PBE ID) (Parameter A14).

An alternative representation of the PBCStart message contains a list of CDHN MAC Addresses of elected CDHN nodes (Parameter A12) or a list of CDHN MAC Addresses of elected CDHN nodes with corresponding MAC Addresses of the elected interfaces for the ts-PBC (Parameter A12 and A13) instead of just a single elected CDHN node or CDHN node and interface.

A CDHN node that receives a PBCStart message may first check whether it is the elected CDHN node. This is the case if the CDHN MAC Address of the CDHN node is contained in Parameter A12 (CDHN MAC Address of elected CDHN node) of the received PBCStart message.

If this is the case, the elected CDHN node starts the technology-specific PBC run at the communication technology interface specified in Parameter A13 (MAC Address of the interface at which the ts-PBC run has to be started) of the received PBCStart message. If Parameter A13 is not available, the ts-PBC run is started on all communication technology interfaces of the elected CDHN node.

The ts-PBC is already running at the enrollee, and now also the corresponding ts-PBC at a CDHN node of the network is running. Due to the election process at the CDHN registrar, the CDHN node is actually in reach of the enrollee and there is only a single CDHN node that runs the ts-PBC for an interface of the enrollee. This prevents deadlocks caused by simultaneous ts-PBC runs.

The enrollee might have multiple communication interfaces of the same technology. Depending on the actual communication technology, this might still lead to deadlocks caused by simultaneous ts-PBC runs with the previously described method. Therefore, in an extension, the CDHN registrar will elect no more than one CDHN node per communication technology or communication technology which is prone to deadlocks of the ts-PBC (such as Wi-Fi Protected Setup). This restriction can be made, for instance, by analyzing the Media information about the communication technology of the interface through which the PBCActivated message has been received at the originator of the PBCRequest (Parameter A7 of the PBCRequest). In this extension, Media Information of communication technology interface has to be included in the PBCRequest (Parameter A5 of the PBCActivated message or Parameter A7 of the PBCRequest message).

An alternative to sending the PBCActivated messages at level-1 by the enrollee as described above in the section on level-1 actions on E-PBE is the following:

On an enrollee Push Button Event E-PBE the enrollee starts the technology-specific Push Button configuration methods (ts-PBC methods), if available, on each of its unauthenticated (CDHN) interfaces. There are no level-1 actions required except starting the ts-PBC methods (the level-2 actions).

If the nodes of the CDHN are in state CDHN_PBC_enabled, they wait for the receipt of technology-specific messages sent by the enrollee announcing the wish for a ts-PBC.

If a CDHN node is in state CDHN_PBC_enabled and receives such technology-specific messages from the enrollee, it performs similar actions as if it had received a PBCActivated message from the enrollee, for instance, duplicate detection, construction of a PBCRequest message out of the technology-specific PBC messages, and sending this PBCRequest message to the CDHN registrar.

This alternative provides only technology-specific information about the enrollee to the CDHN node, but no CDHN specific information about the enrollee, especially not the CDHN MAC Address of the enrollee. This alternative will work fine, if the enrollee has only one interface where it wants to perform a ts-PBC. The technology-specific information about the enrollee is sufficient for the CDHN registrar to prevent overlapping PBC sessions and to avoid deadlock of ts-PBC runs in this case. However, if the enrollee has multiple interfaces where it wants to perform a ts-PBC, the CDHN registrar will consider this as overlapping PBC sessions, because the CDHN MAC Address that is common to all these interfaces and connects all these interfaces to the same enrollee is not available to the CDHN registrar.

In order to illustrate the solution to the problems described for Push Button Configurations in Convergent Digital Home Networks to achieve a reliable prevention of overlapping PBC sessions without any deadlocks of technology specific PBC methods, examples for using the two-level CDHN Push Button Configuration method (or two-step CDHN PBC approach) are given. The examples also make use of some of the extensions of the described embodiment.

FIG. 4 shows an example network topology of a heterogeneous network such as a Convergent Digital Home Network (CDHN). The network node devices D1 . . . D6 of the Convergent Digital Home Network are connected with each other through possibly heterogeneous communication technologies. The network node devices of the Convergent Digital Home Network are also called CDHN nodes. Communication between devices of the network can be over multiple hops. The Convergent Digital Home Network of FIG. 4 contains besides the network node devices respectively CDHN nodes D1 . . . D6 more network node devices than the cited ones and those devices are intermediate nodes on the communication between CDHN nodes D1 . . . D6. With respect to FIG. 2 the devices have different underlying communication technologies MAC "A", MAC "B", MAC "C", and MAC "E". The MAC "A" might be WLAN/WiFi (IEEE 802.11), the MAC "C" might be the Power Line Communication (PLC; IEEE 1901), the MAC "E" might be Ethernet (IEEE 802.3), and the MAC "B" might be some other communication technology, e.g. Multimedia over Coax Alliance (MoCA).

According to FIG. 4 the registrar functionality is assigned to the network node device D6. It has been assigned the role of CDHN Registrar by some configuration mechanism, e.g. method M1. The information that the network node device D6 is the CDHN Registrar has been made available to all CDHN nodes by some suitable means.

The nomenclature for the MAC addresses in the examples is as follows:

MAC_Dx CDHN MAC Address of CDHN device Dx
MAC_Dx_X MAC Address of underlying communication technology MAC X at CDHN device Dx. If there are multiple interfaces for communication technology MAC X at the same CDHN device, they will be indexed (MAC_Dx_Xi).

Note: Although there is some relationship between CDHN MAC address and interface MAC address in the nomenclature of the MAC addresses, there is none in the devices. Without any additional information, it cannot be derived from MAC_Dx and MAC_Dx_X that both addresses belong to the same device. The same applies to MAC_Dx_X and MAC_Dx_Y.

Figure 6:
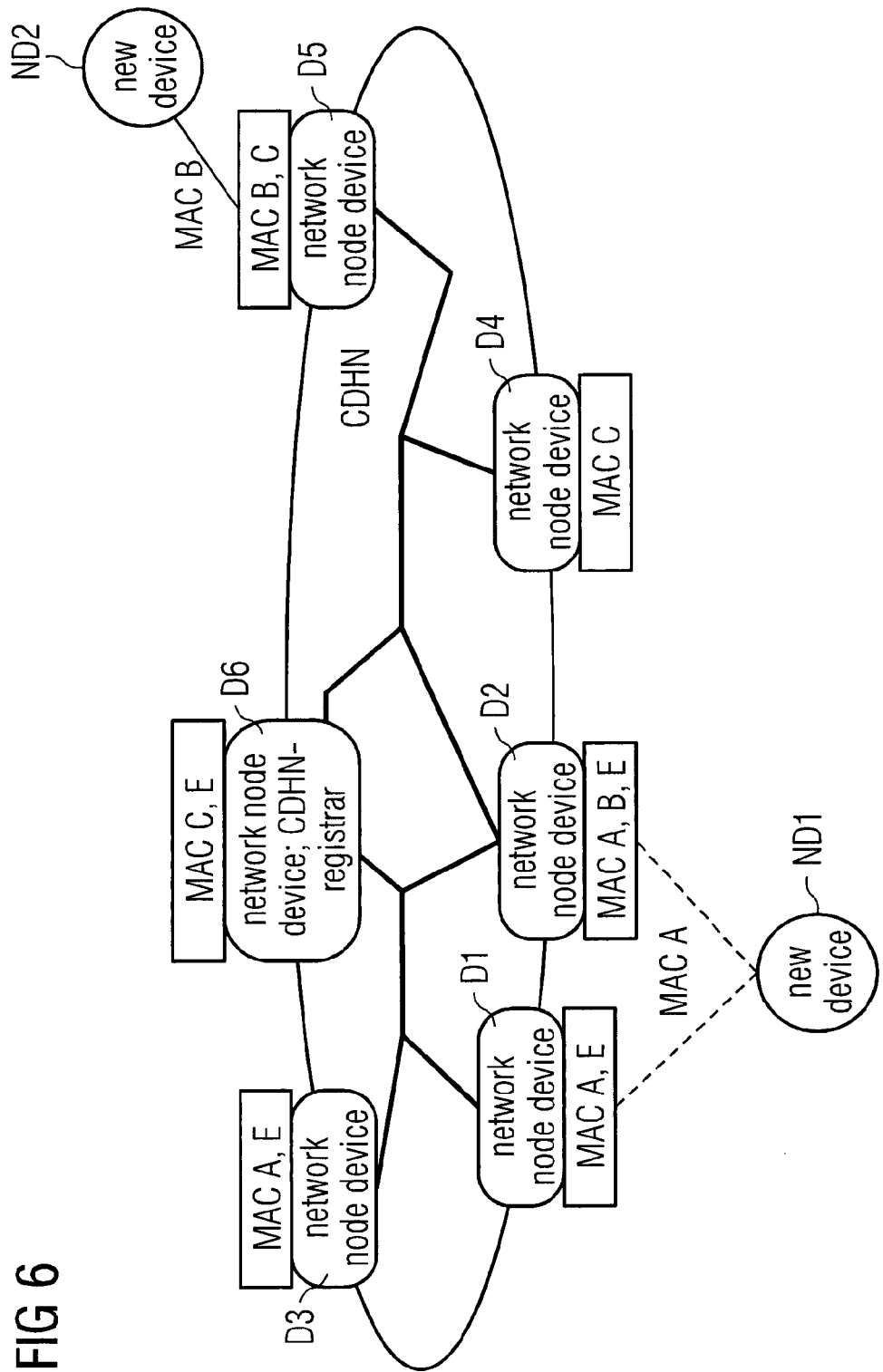
FIG. 6 is a block diagram based on FIG. 4 of a modified Convergent Digital Home Network (CDHN) for detecting and preventing overlapping PBC sessions and preventing deadlock of technology-specific Push Button Configurations, FIG. 7 a sequence diagram for detecting and preventing overlapping PBC sessions, FIG. 8 a sequence diagram for preventing a deadlock between PBC sessions of the same technology.

FIG. 6 shows based on FIG. 4 a modified topology of a Convergent Digital Home Network (CDHN) with two enrollees—a new device ND1ND1 that a user wants to integrate into his Convergent Digital Home Network and an "accidential" new device ND2, whereas the registrar functionality is assigned to the network node device D6.

It is assumed in the cited CDHN topology that all network node devices other than the network node devices D1 . . . D6 are considered transparent, so that the following neighbor relationships for the description is valid:

neighbors of D1 are D2, D3, and D6
neighbors of D2 are D1, D3, D4, D5, and D6
neighbors of D3 are D1, D2, and D6
neighbors of D4 are D2, D5, and D6
neighbors of D5 are D2, D4, and D6
neighbors of D6 are D1, D2, D3, D4, and D5

Figure 7:
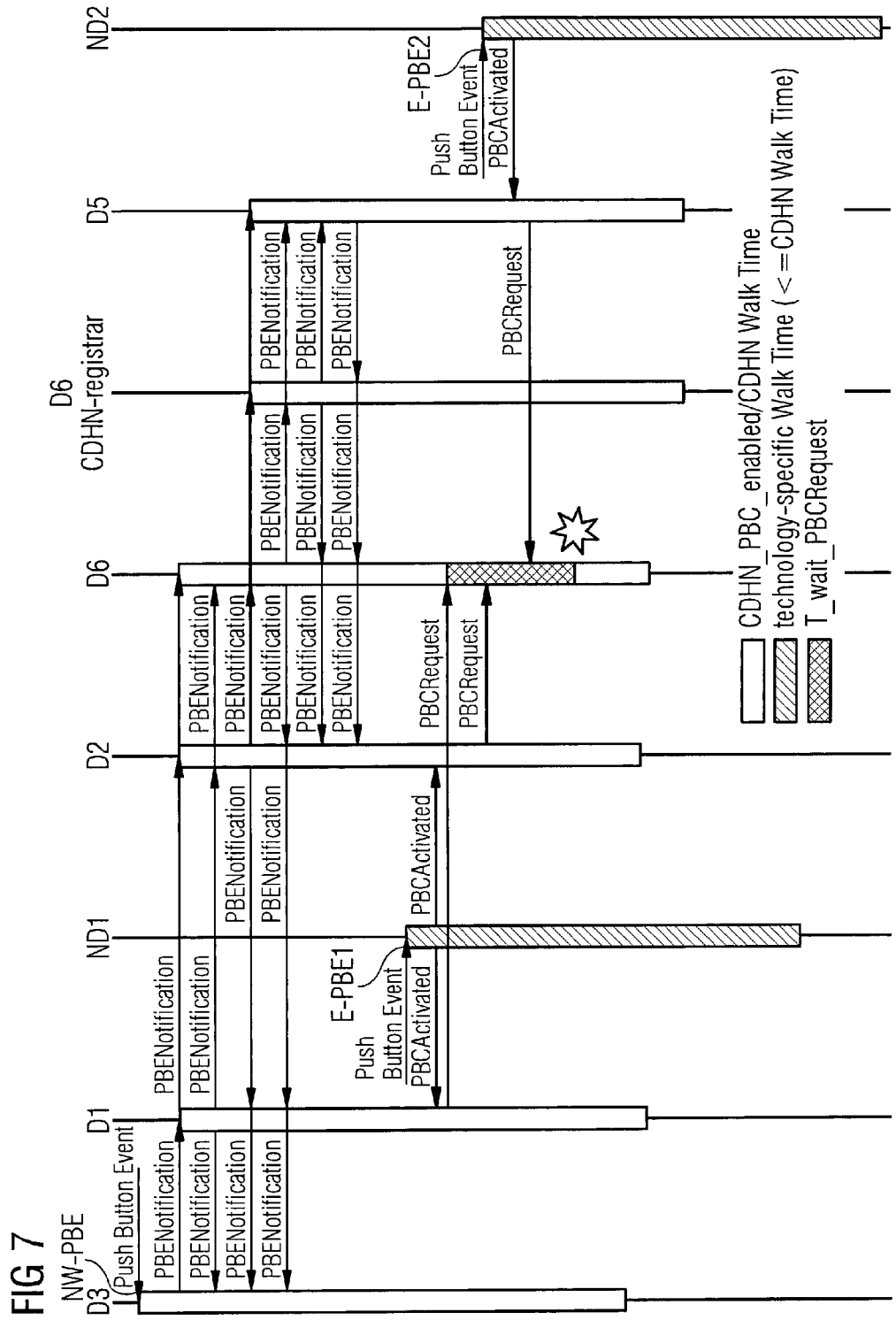

FIG. 7 shows based on the sequence diagram of FIG. 5 the flow of messages in the CDHN network shown in FIG. 6 in a sequence diagram. FIG. 7 shows how according to the described embodiment overlapping Push Button Configuration (PBC) sessions are detected and how according to the described embodiment authentication of multiple enrollees ND1 and ND2 with the CDHN is prevented.

The user presses a push button at the network node device D3 of the network node devices D1 . . . D6, which leads to a network Push Button Event NW-PBE. Around the same time he presses a push button at the new device ND1, the enrollee, which leads to an enrollee Push Button Event E-PBE1. Somehow, a push button is also pressed at the "accidential" new device ND2, which leads to a enrollee Push Button Event E-PBE2.

Description of Events and Messages According to FIG. 7:

A network Push Button Event NW-PBE at the (first) network node device respectively CDHN node D3.

- The CDHN node D3 goes into state CDHN_PBC_enabled for a CDHN Walk Time of 120 seconds.
- The CDHN node D3 broadcasts PBENotification message to its neighbors the network node devices D1, D2, and D6. The PBENotification message contains the following information: the data "MAC_D3" as CDHN MAC Address of the originator of the PBENotification message, the data "1913" as Push Button Event ID (PBE ID).
- The network node devices D1, D2, and D6 receive the PBENotification message from the CDHN node D3 and go into state CDHN_PBC_enabled for a CDHN Walk Time of 120 seconds.
- The network node devices D1, D2, and D6 relay the PBENotification message to their neighbors. The PBENotification messages illustrated with thin lines are detected as duplicates by the recipients and are not processed (discarded). The duplicates are detected by comparing the CDHN MAC Address of the originator of the PBENotification message (the data "MAC_D3") and the PBE ID (the data "1913").
- The CDHN nodes D4 and D5 receive the PBENotification message from the CDHN node D2 and go into state CDHN_PBC_enabled for a CDHN Walk Time of 120 seconds.
- The CDHN nodes D4 and D5 relay the PBENotification message to their neighbors.

An enrollee Push Button Event E-PBE1 at the new device respectively the enrollee ND1. The user wants to include this device in his home network. The enrollee ND1 goes into state CDHN_PBC_enabled for a CDHN Walk Time of 120 seconds. Furthermore, ND1 starts its technology-specific PBC run for MAC A with a technology-specific walk time of 120 seconds.

- The enrollee ND1 sends out PBCActivated messages on its interface MAC_ND1_A (MAC "A"). The PBCActivated message contains the following information: The data "MAC_ND1" as CDHN MAC Address of the enrollee (Parameter A2), the data "2719" as PBE ID (Parameter A3), the data "MAC_ND1_A" as MAC Address of the interface through which the PBCActivated message is sent (Parameter A4). Media information (Parameter A5) is not included in this example.

The enrollee ND1 may send only one PBCActivated message on its interface MAC_ND1_A (MAC "A") if it can be ensured that the corresponding CDHN node will receive this single PBCActivated message. If there is some discovery mechanism involved where the CDHN node will not necessarily receive every PBCActivated message, the enrollee ND1 should send out multiple PBCActivated messages, e.g., periodically. These multiple PBCActivated messages are identical in the main parameters A2, A3, A4, and A5. FIG. 7 shows only the first PBCActivated message sent by an enrollee (ND1 or ND2). Subsequent PBCActivated messages sent by an enrollee (ND1 or ND2) are detected as duplicates by the recipients and are not processed (discarded). The duplicates are detected by comparing Parameter A2 (the data "MAC_ND1") and Parameter A3 (the data "2791") of the messages or Parameter A4 (the data "MAC_ND1_A") and Parameter A3 (the data "2791") of the messages.

- The CDHN nodes D1 and D2 adjacent to the enrollee ND1 each receive a PBCActivated message from the enrollee ND1.
- CDHN node D1 sends a PBCRequest message to the CDHN registrar D6. The PBCRequest message contains the following information: The information received in the PBCActivated message (the data "MAC_ND1", "2791", "MAC_ND1_A"), MAC "A" as Media information on the receiving interface (Parameter A7), the information "medium" as Link Quality (Parameter A8), the data "MAC_D1" as CDHN MAC Address of the recipient of the PBCActivated message/originator of the PBCRequest message (Parameter A9), the data "1913" as PBE ID (Parameter A10), the data "MAC_D1_A" as MAC Address of the interface through which the PBCActivated message has been received (Parameter A11).
- The CDHN registrar D6 receives the PBCRequest message from D1, stores its information and waits for T_wait_PBCRequest for further PBCRequest messages.
- The CDHN node D2 sends a PBCRequest message to the CDHN registrar D6. The PBCRequest message contains the following information: The information received in the PBCActivated message (the data "MAC_ND1", "2791", "MAC_ND1_A"), MAC "A" as Media information on the receiving interface (Parameter A7), the information "excellent" as Link Quality (Parameter A8), the data "MAC_D2" as CDHN MAC Address of the recipient of the PBCActivated message/originator of the PBCRequest message (Parameter A9), the data "1913" as PBE ID (Parameter A10), the data "MAC_D2_A" as MAC Address of the interface through which the PBCActivated message has been received (Parameter A11).
- The CDHN registrar D6 is waiting for further PBCRequest messages. The CDHN registrar D6 receives the PBCRequest message from the network node device D2 and stores its information and continues to wait for further PBCRequest messages.

An "accidential" enrollee Push Button Event E-PBE2 at the new device respectively enrollee ND2. The new device ND2 that accidentally receives a Push Button Event. The enrollee ND2 goes into state CDHN_PBC_enabled for a CDHN Walk Time of 120 seconds. Furthermore, ND2 starts its technology-specific PBC run for MAC "B" with a technology-specific walk time of 120 seconds.

- The enrollee ND2 sends out PBCActivated messages on its interface MAC_ND2_B (MAC "B"). The PBCActivated message contains the following information: The data "MAC_ND2" as CDHN MAC Address of the enrollee (Parameter A2), the data "9591" as PBE ID (Parameter A3), the data "MAC_ND2_B" as MAC Address of the interface through which the PBCActivated message is sent (Parameter A4). Media information (Parameter A5) is not included in this example.

The enrollee ND2 may send only one PBCActivated message on its interface MAC_ND2_B (MAC "B") if it can be ensured that the corresponding CDHN node will receive this single PBCActivated message. If there is some discovery mechanism involved where the CDHN node will not necessarily receive every PBCActivated message, the enrollee ND2 should send out multiple PBCActivated messages, e.g., periodically. These multiple PBCActivated messages are identical in the main parameters A2, A3, A4, and A5. FIG. 7 shows only the first PBCActivated message sent by an enrollee (ND1 or ND2). Subsequent PBCActivated messages sent by an enrollee (ND1 or ND2) are detected as duplicates by the recipients and are not processed (discarded). The duplicates are detected by comparing Parameter A2 (the data "MAC_ND2") and Parameter A3 (the data "9591") of the messages or Parameter A4 (the data "MAC_ND2_B") and Parameter A3 (the data "9591") of the messages.

The CDHN node D5 receives a PBCActivated message from the "accidential" enrollee ND2.

The CDHN node D5 sends a PBCRequest message to the CDHN registrar D6. The PBCRequest message contains the following information: The information received in the PBCActivated message (the data "MAC_ND2", "9591", "MAC_ND2_B"), MAC "B" as Media information on the receiving interface (Parameter A7), Link Quality (Parameter A8) is not given, the data "MAC_D5" as CDHN MAC Address of the recipient of the PBCActivated message/originator of the PBCRequest message (Parameter A9), the data "1913" as PBE ID (Parameter A10), the data "MAC_D5_B" as MAC Address of the interface through which the PBCActivated message has been received (Parameter A11).

The CDHN registrar D6 is still waiting for further PBCRequest messages. CDHN registrar D6 receives the PBCRequest message from the network node device D5 and stores its information and continues to wait for further PBCRequest messages.

T_wait_PBCRequest is now over.

The CDHN registrar D6 analyses the received PBCRequest messages for overlapping PBC sessions by comparing Parameter A2. Table 2 shows the received PBCRequest messages and the relevant information.

TABLE 2

Relevant content of received PBCRequest messages
for detection of overlapping PBC sessions

| Enrollee CDHN MAC Address (Parameter A2) | MAC Address of interface at enrollee through which PBCActivated message has been sent (Parameter A4) |
|---|---|
| MAC_ND1 | MAC_ND1_A |
| MAC_ND1 | MAC_ND1_A |
| MAC_ND2 | MAC_ND2_B |

There are two distinct Enrollee CDHN MAC Addresses (Parameter A2): the data "MAC_ND1" and the data "MAC_ND2". Therefore, there is more than one enrollee trying to get authenticated with the Convergent Digital Home Network. This constitutes overlapping PBC sessions. This is indicated by the star (✩) next to the timeline of the CDHN registrar D6 in FIG. 7.

The CDHN registrar D6 issues an indication of overlapping PBC sessions to the user interface and to other devices D1 . . . D5 of the Convergent Digital Home Network.

The network node devices D1 . . . D6, ND1, and ND2 will leave state CDHN_PBC_enabled after CDHN Walk Time is over. The new devices ND1 and ND2 will finish their technology-specific PBC run without success after the technology-specific walk time is over since no CDHN node had started the corresponding ts-PBC.

Figure 8:
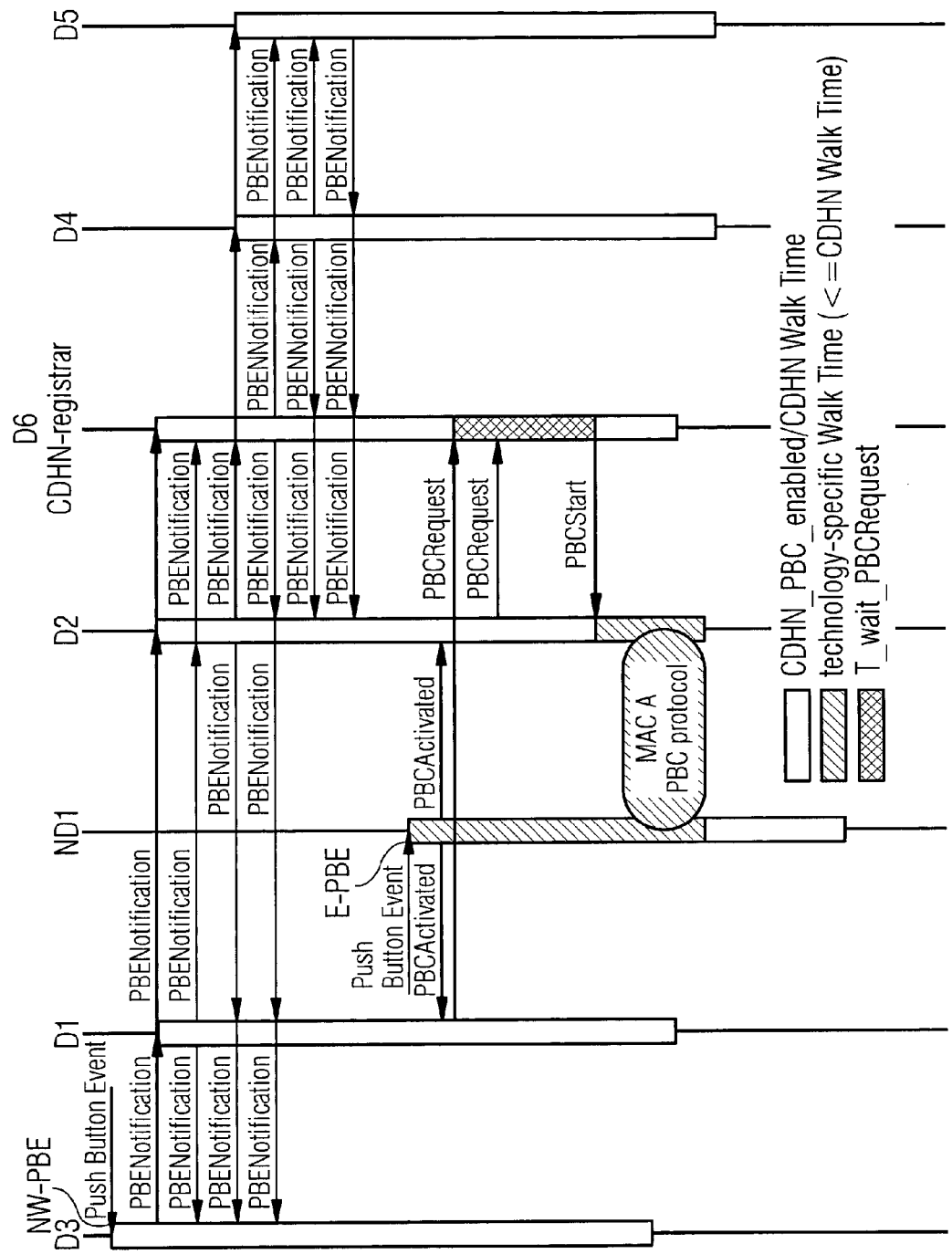

FIG. 8 shows based on the sequence diagram of FIG. 5 the flow of messages in the CDHN network shown in FIG. 6 in a sequence diagram. FIG. 8 shows how according to the described embodiment a deadlock between PBC runs of the same technology (e.g. MAC "A") for the enrollee ND1 is prevented. The sequence diagram is based on the modified topology of a Convergent Digital Home Network (CDHN) shown in FIG. 6 but without the "accidential" new device ND2 and whereas the registrar functionality is assigned again to the network node device D6.

The user presses again a push button at the network node device D3 of the network node devices D1 . . . D6, which leads to a network Push Button Event NW-PBE. Around the same time he presses a push button at the new device ND1, the enrollee, which leads to an enrollee Push Button Event E-PBE1.

Description of Events and Messages According to FIG. 8:

The events and messages are the same as in the sequence chart of FIG. 7 up to the "accidential" enrollee Push Button Event E-PBE2 at the new device respectively enrollee ND2 in the first example. In other words the "accidential" enrollee Push Button Event E-PBE2 does not happen.

T_wait_PBCRequest is now over.

CDHN registrar D6 analyses the received PBCRequest messages for overlapping PBC sessions by comparing Parameter A2. Table 3 shows the received PBCRequest messages and the relevant information.

TABLE 3

Relevant content of received PBCRequest messages
for detection of overlapping PBC sessions

| Enrollee CDHN MAC Address (Parameter A2) | MAC Address of interface at enrollee through which PBCActivated message has been sent (Parameter A4) |
|---|---|
| MAC_ND1 | MAC_ND1_A |
| MAC_ND1 | MAC_ND1_A |

There is only one distinct Enrollee CDHN MAC Address (Parameter A2): The data "MAC_ND1". Therefore, there is only one enrollee trying to get authenticated with the CDHN. This constitutes a non-overlapping PBC session.

The CDHN registrar D6 elects a CDHN node from the network nodes D1, D2 of the CDHN nodes D1 . . . D6 of the CDHN network for running the technology-specific PBC (ts-PBC). The CDHN registrar D6 analyses the received PBCRequest messages for potential deadlock of ts-PBC sessions by comparing Parameter A4 and A11 of the received PBCRequest messages. Table 4 shows the received PBCRequest messages and the relevant information for the election of a CDHN node.

TABLE 4

Relevant content of received PBCRequest messages for election of CDHN node

| Enrollee CDHN MAC Address (Parameter A2) | MAC Address of interface at enrollee through which PBCActivated message has been sent (Parameter A4) | MAC Address of the interface at the CDHN node through which the PBCActivated message has been received (Parameter A11) | CDHN MAC Address of CDHN node (recipient PBCActivated message/originator PBCRequest message) (Parameter A9) | Media information on receiving interface (Parameter A7) | Link Quality (Parameter A8) |
|---|---|---|---|---|---|
| MAC_ND1 | MAC_ND1_A | MAC_D1_A | MAC_D1 | MAC A | Medium |
| MAC_ND1 | MAC_ND1_A | MAC_D2_A | MAC_D2 | MAC A | Excellent |

There is only one distinct Parameter A4 (the data "MAC_ND1_A"). For the Parameter A4=MAC_ND1_A, there are two distinct Parameter A11 (the data "MAC_D1_A" and the data "MAC_D2_A") indicating two candidate CDHN nodes for the ts-PBC (MAC_D1 and MAC_D2). Starting the ts-PBC at both the network node device D1 and the network node device D2 has the potential for a deadlock of ts-PBC sessions, especially if additional knowledge derived from the media information (MAC "A") indicates this.

The CDHN registrar D6 elects the network node device D2 as CDHN node for the ts-PBC since Parameter A8 indicates that the PBCRequest with Parameter A11=MAC_D2_A is the better choice (Link Quality is excellent, compared to medium for Parameter A11=MAC_D1_A).

The CDHN registrar D6 sends a PBCStart message to the elected CDHN node D2. The PBCStart message contains the following information: The data "MAC_D2" as CDHN MAC Address of the elected network node (Parameter A12), the data "MAC_D2_A" as MAC Address of the interface for the ts-PBC (Parameter A13), the data "1913" as PBE ID (Parameter A14)

The elected CDHN node D2 receives the PBCStart message, does some sanity check (CDHN MAC Address of the CDHN node D2 is value of Parameter A12, PBE ID is current, etc.) which passes successfully.

The CDHN node D2 starts its technology-specific PBC run for MAC "A" at the interface with MAC Address "MAC_D2_A" with a technology-specific walk time of 120 seconds.

Since the enrollee ND1 has already its technology-specific PBC running and the CDHN node D2 starts its ts-PBC within the technology-specific walk time at ND1, the ts-PBC finds a match and finishes with success.

The technology-specific walk times at the enrollee ND1 and the CDHN node D2 are finished with the successful ts-PBC session.

The network node devices D1 . . . D6 and ND1 will leave state CDHN_PBC_enabled after CDHN Walk Time is over.

With the election of the CDHN node D2 for the technology-specific PBC, the deadlock of the ts-PBC session at the CDHN node D1 and the CDHN node D2 has been prevented. Furthermore, the election based on the link quality allows choosing the better link for the communication technology MAC "A".

Figure 9:
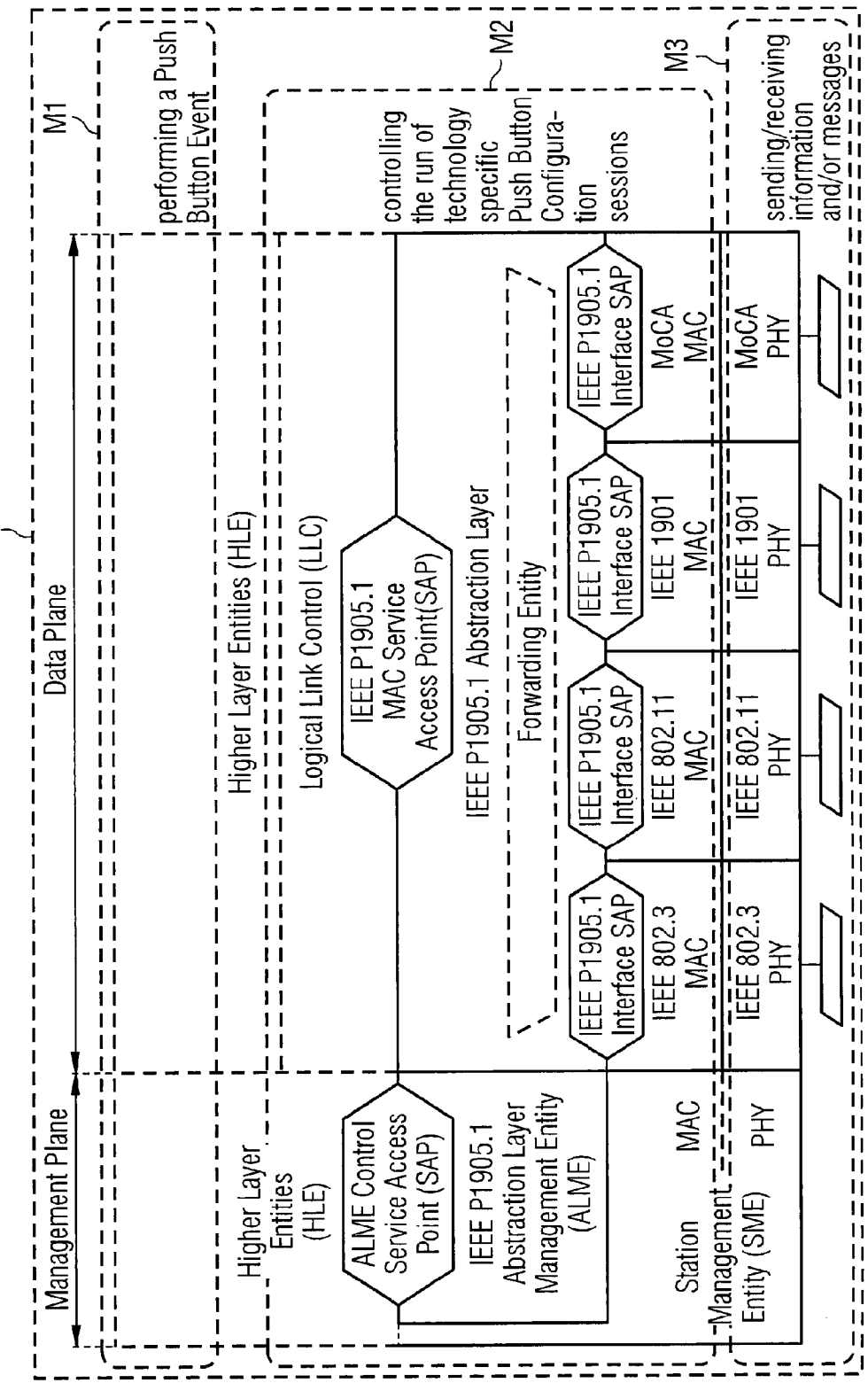
FIG. 9 is a block diagram illustrating the structure of a network node device for controlling the run of technology specific Push Button Configuration sessions within a heterogeneous network with multiple communication network technologies based on the abstraction layer embedded in the IEEE P1905.1-Architecture above the Media Access Control (MAC)-layer and the Physical layer according to FIG. 2.

FIG. 9 shows the structure of the network node devices D1, D2, D4; D1 . . . D5, especially the registrar network node device D2; D6, each with at least one interface for controlling the run of technology specific Push Button Configuration sessions within a heterogeneous network with multiple communication network technologies based on the abstraction layer embedded in the IEEE P1905.1-Architecture above the Media Access Control (MAC)-layer and the Physical layer according to FIG. 2. According to FIG. 9 the network node devices D1, D2, D4; D1 . . . D5, especially the registrar network node device D2; D6, in contrast to the network node device NND of FIG. 2, include the capability of performing a Push Button Event (PBE) M1, controlling the run of technology specific Push Button Configuration sessions M2 and sending/receiving information and/or messages M3. While M3 includes or incorporates all entities of the IEEE P1905.1-Architecture belonging to the Physical Layer and M1 incorporates the entities of the IEEE P1905.1-Architecture belonging to the Application Layer entities, which are part of the Higher Layer Entities (HLE), controlling the run of technology specific Push Button Configuration sessions M2 incorporates all entities in the data- and management plane of the IEEE P1905.1-Architecture from the MAC-Layer including the Abstraction Layer with the IEEE P1905.1 Abstraction Management Entity (ALME) and the corresponding Service Access Points (SAP) via the Logical Link Control (LLC) up to the Higher Layers with its most entities.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for controlling a run of technology specific Push Button Configuration sessions within a heterogeneous network with multiple communication network technologies and a plurality of network node devices interconnected to each other via at least one interface and/or over multiple hops and authenticated or unauthenticated for the network, comprising:

enabling a two-level Push Button Configuration within the heterogeneous network, within a Convergent Digital Home Network according to IEEE P1905.1, by a registrar network node device that is one of selected and predetermined from among authenticated network node devices that are authenticated for the network, by performing in level-1 of the two-level Push Button Configuration:

triggering a first network node device among the authenticated network node devices, by a first Push Button Event that is one of virtual and physical and is assigned to the first network node device, to send via the at least one interface a notification message about the first Push Button Event directly or indirectly to the registrar network node device and at least one other authenticated network node device;

triggering, as an enrollee, at least one second network node device, among the network node devices, each unauthenticated for the network, by at least one second Push Button Event that is one of virtual and physical, respectively assigned to the at least one second network node device, to start a technology specific Push Button Configuration at the at least one second network node device and to notify, via the at least one interface, at least one adjacent network node device, among the authenticated network node devices, adjacent to the at least one second network node device using at least one technology specific message announcing at least one of a request for a technology specific Push Button Configuration session and a PBC activated message;

forwarding to the registrar network node device, via the at least one interface by the at least one adjacent network node device that received the at least one technology specific message, a PBC request message based on the at least one technology specific message, directly or indirectly via at least one third network node device among the authenticated network node devices that is not adjacent to the at least one second network node device;

counting the at least one second network node devices at the registrar network node based on device specific data received with each PBC request message;

sending, via the at least one interface when only one second network node device is counted, a PBC start message only to a single elected network node device among the authenticated network node devices that received the notification message; and establishing, by the elected network node device, the technology specific Push Button Configuration session with the second network node device; and running the technology specific Push Button Configuration session in a level-2 of the two-level Push Button Configuration by the elected network node device and the second network node device.

2. The method according to claim 1, wherein the PBC activated message contains a MAC address of the enrollee.

3. The method according to claim 1, wherein the PBC activated message contains at least one of a Push Button Event Identifier, a MAC address of an interface through which the PBC activated message is sent and media information about the communication technology of the interface through which the PBC activated message is sent.

4. The method according to claim 1, wherein the PBC request message contains a MAC address of at least one of a recipient of the technology specific message and an originator of the PBC request message.

5. The method according to claim 4, wherein the PBC request message contains at least one of a Push Button Event Identifier for linking at least one of the notification message, the PBC activated message and the PBC request message to a specific Push Button Event; information about the link quality; a MAC address of an interface through which the at least one technology specific message is received; and media information about communication technology of the interface through which the at least one technology specific message is received.

6. The method according to claim 1, wherein the device specific data include at least one of a MAC address of a first interface through which the PBC activated message is sent, and the MAC address of a second interface through which the at least one technology specific message is received.

7. The method according to claim 1, wherein the registrar network node device elects the elected network node device
when all received PBC request messages contain identical device specific data;
when all received PBC request messages contain an identical MAC address of a first interface through which the PBC activated message is sent; and
when communication technology interfaces are potential PBC partners for a same interface of the enrollee based on received PBC request messages for a distinct MAC address of the first interface through which the PBC activated message is sent containing at least two of
a first MAC address of at least one of a recipient of the at least one technology specific message and an originator of the PBC request message,
information about the link quality,
a second MAC address of a second interface through which the at least one technology specific message is received, and
media information about communication technology of the second interface through which the at least one technology specific message is received.

8. The method according to claim 1, wherein the PBC start message contains a MAC address of the elected network node device which is at least one of a recipient of the at least one technology specific message and an originator of the PBC request message.

9. The method according to claim 8, wherein the PBC start message contains at least one of a Push Button Event Identifier linking at least one of the notification message, the PBC activated message and the PBC request message and the PBC start message to a specific Push Button Event; and a MAC address of an interface at which a technology specific PBC run is started.

10. A registrar network node device with at least one interface for controlling a run of technology specific Push Button Configuration sessions within a heterogeneous network with multiple communication network technologies with a plurality of other network node devices interconnected to each other via at least one interface and/or over multiple hops and authenticated or unauthenticated for the network, being authenticated for the network and especially selectable or determined, comprising:
a processor coupled to a memory;
a PBE engine for performing a Push Button Event;
a communication interface for sending/receiving at least one of information and messages enabling a two-level Push Button Configuration within a Convergent Digital Home Network according to IEEE P1905.1, in level-1 of the two-level Push Button Configuration triggered by the PBE engine to
send via the at least one interface a notification message about a first Push Button Event that is one of virtual and physical, directly or indirectly to at least one second network node device among the other network node devices that are authenticated, and
receive, via the at least one interface directly or indirectly via at least one of the other network node devices, from at least one of the at least one second network node device, at least one PBC request message based on at least one technology specific message announcing at least one of a request for a technology specific Push Button Configuration session and a PBC activated message generated by at least one third network node device, among the other network node devices that are unauthenticated, as an enrollee in a technology specific Push Button Configuration based on a second Push Button Event that is virtual or physical and is assigned to the at least one third network node device and sent by the at least one third network node device via the at least one interface to at least one adjacent network node device adjacent to the at least one third network node device; and a controller for controlling the run of technology specific Push Button Configuration sessions by counting the at least one third network node device based on device specific data received with each PBC request message, and sending, when applicable based on the counting, via the communication interface and the at least one interface, a PBC start message only to a single elected network node device among the authenticated network node devices that received the notification message, to establish the technology specific Push Button Configuration session by the elected network node device and the third network node device in level-2 of the two-level Push Button Configuration.

11. A registrar network node device with at least one interface for controlling a run of technology specific Push Button Configuration sessions within a heterogeneous network with multiple communication network technologies with a plurality of other network node devices interconnected to each other via at least one interface and/or over multiple hops and authenticated or unauthenticated for the network, being authenticated for the network and especially selectable or determined, comprising:

a processor coupled to a memory;

a communication interface for sending/receiving at least one of information and messages enabling a two-level Push Button Configuration within a Convergent Digital Home Network according to IEEE P1905.1, in level-1 of the two-level Push Button Configuration to receive a notification message triggered by a first Push Button Event that is one of virtual and physical and is assigned to a first network node device among the other network node devices that are authenticated, send via the at least one interface the notification message about the first Push Button Event, directly or indirectly to at least one second network node device among the other network node devices that are authenticated, and receive, via the at least one interface directly or indirectly via at least one of the other network node devices, from at least one of the at least one second network node device, at least one PBC request message based on at least one technology specific message announcing at least one of a request for a technology specific Push Button Configuration session and a PBC activated message generated by at least one third network node device, among the other network node devices that are unauthenticated, as an enrollee in a technology specific Push Button Configuration based on a second Push Button Event that is virtual or physical and is assigned to the at least one third network node device and sent by the at least one third network node device via the at least one interface to at least one adjacent network node device adjacent to the at least one third network node device; and a controller for controlling the run of technology specific Push Button Configuration sessions by counting the at least one third network node device based on device specific data received with each PBC request message, and sending, when applicable based on the counting, via the communication interface and the at least one interface, a PBC start message only to a single elected network node device among the authenticated network node devices that received the notification message, to establish the technology specific Push Button Configuration session by the elected network node device and the third network node device in level-2 of the two-level Push Button Configuration.

12. The registrar network node device according to claim 11, wherein the PBC activated message contains a MAC address of the enrollee.

13. The registrar network node device according to claim 11, wherein the PBC activated message contains at least one of a Push Button Event Identifier, a MAC address of an interface through which the PBC activated message is sent and media information about the communication technology of the interface through which the PBC activated message is sent.

14. The registrar network node device according to claim 11, wherein the PBC request message contains a MAC address of at least one of a recipient of the technology specific message and an originator of the PBC request message.

15. The registrar network node device according to claim 14, wherein the PBC request message contains at least one of a Push Button Event Identifier for linking at least one of the notification message, the PBC activated message and the PBC request message to a specific Push Button Event; information about the link quality; a MAC address of an interface through which the at least one technology specific message is received; and media information about communication technology of the interface through which the at least one technology specific message is received.

16. The registrar network node device according to claim 11, wherein the device specific data include at least one of a MAC address of a first interface through which the PBC activated message is sent, and the MAC address of a second interface through which the at least one technology specific message is received.

17. The registrar network node device according to claim 11, wherein the registrar network node device elects the elected network node device when all received PBC request messages contain identical device specific data;

when all received PBC request messages contain an identical MAC address of a first interface through which the PBC activated message is sent; and when communication technology interfaces are potential PBC partners for a same interface of the enrollee based on received PBC request messages for a distinct MAC address of the first interface through which the PBC activated message is sent containing at least two of a first MAC address of at least one of a recipient of the at least one technology specific message and an originator of the PBC request message, information about the link quality, a second MAC address of a second interface through which the at least one technology specific message is received, and media information about communication technology of the second interface through which the at least one technology specific message is received.

18. The registrar network node device according to claim 11, wherein the PBC start message contains a MAC address of the elected network node device which is at least one of a recipient of the at least one technology specific message and an originator of the PBC request message.

19. The registrar network node device according to claim 18, wherein the PBC start message contains at least one of a Push Button Event Identifier linking at least one of the notification message, the PBC activated message, the PBC request message and the PBC start message to a specific Push Button Event; and a MAC address of an interface at which a technology specific PBC run is started.

20. At least one non-transitory computer readable storage medium embodying computer instructions, executable by at least one processor in at least one network node device, for controlling a run of technology specific Push Button Configuration sessions within a heterogeneous network with multiple communication network technologies with a plurality of network node devices interconnected to each other via at least one interface and/or over multiple hops and authenticated or unauthenticated for the network, comprising:

enabling a two-level Push Button Configuration within the heterogeneous network, within a Convergent Digital Home Network according to IEEE P1905.1, by a registrar network node device that is one of selected and predetermined from among authenticated network node devices that are authenticated for the network, by performing in level-1 of the two-level Push Button Configuration:

triggering a first network node device among the authenticated network node devices, by a first Push Button Event that is one of virtual and physical and is assigned to the first network node device, to send via the at least one interface a notification message about the first Push Button Event directly or indirectly to the registrar network node device and at least one other authenticated network node device;

triggering, as an enrollee, at least one second network node device, among the network node devices, each unauthenticated for the network, by at least one second Push Button Event that is one of virtual and physical, respectively assigned to the at least one second network node device, to start a technology specific Push Button Configuration at the at least one second network node device and to notify, via the at least one interface, at least one adjacent network node device, among the authenticated network node devices, adjacent to the at least one second network node device using at least one technology specific message announcing at least one of a request for a technology specific Push Button Configuration session and a PBC activated message;

forwarding to the registrar network node device, via the at least one interface by the at least one adjacent network node device that received the at least one technology specific message, a PBC request message based on the at least one technology specific message, directly or indirectly via at least one third network node device among the authenticated network node devices that is not adjacent to the at least one second network node device;

counting the at least one second network node devices at the registrar network node based on device specific data received with each PBC request message;

sending, via the at least one interface when only one second network node device is counted, a PBC start message only to a single elected network node device among the at least one adjacent network node device; and establishing, by the elected network node device, the technology specific Push Button Configuration session with the second network node device; and running the technology specific Push Button Configuration session in a level-2 of the two-level Push Button Configuration by the elected network node device and the second network node device.

21. A heterogeneous network for controlling a run of technology specific Push Button Configuration sessions, comprising:

a processor coupled to a memory;

a plurality of network node devices interconnected to each other via at least one interface and/or over multiple hops and authenticated or unauthenticated for the heterogeneous network, including a first network node device that is authenticated and generates a notification message triggered by a first Push Button Event that is one of virtual and physical and is assigned to the first network node device, at least one second network node device, each unauthenticated for the heterogeneous network, starting a technology specific Push Button Configuration triggered by at least one second Push Button Event that is one of virtual and physical, respectively assigned to the at least one second network node device, and sending, via the at least one interface, at least one technology specific message announcing at least one of a request for a technology specific Push Button Configuration session and a PBC activated message, at least one adjacent network node device adjacent to and receiving from each of the at least one second network node device, the at least one technology specific message and sending at least one PBC request message based on the at least one technology specific message; and a registrar network node device, including a communication interface for sending/receiving at least one of information and messages enabling a two-level Push Button Configuration within a Convergent Digital Home Network according to IEEE P1905.1, in level-1 of the two-level Push Button Configuration to receive the notification message from first network node device via the at least one interface and forward the notification message about the first Push Button Event, directly or indirectly, to other of the network node devices that are authenticated, and receive, via the at least one interface directly or indirectly via at least one of the network node devices, from at least one of the adjacent network node devices, the at least one PBC request message; and a controller for controlling the run of technology specific Push Button Configuration sessions by counting the at least one second network node device based on device specific data received with each PBC request message, and sending, when applicable based on the counting, via the communication interface and the at least one interface, a PBC start message only to a single elected network node device among authenticated network node devices that received the notification message, to establish the technology specific Push Button Configuration session by the elected network node device and the second network node device in level-2 of the two-level Push Button Configuration.

* * * * *